(12) United States Patent
Kumar et al.

(10) Patent No.: US 12,289,744 B2
(45) Date of Patent: Apr. 29, 2025

(54) USER EQUIPMENT (UE) CENTRIC POSITION TECHNIQUES IN 5G NEW RADIO WITH MULTIPLE BANDWIDTH PARTS

(71) Applicant: QUALCOMM Incorporated, San Diego, CA (US)

(72) Inventors: Akash Kumar, Hyderabad (IN); Amit Jain, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 432 days.

(21) Appl. No.: 17/125,698

(22) Filed: Dec. 17, 2020

(65) Prior Publication Data

US 2022/0201676 A1   Jun. 23, 2022

(51) Int. Cl.
| | |
|---|---|
| *H04W 72/51* | (2023.01) |
| *H04L 5/00* | (2006.01) |
| *H04W 72/0453* | (2023.01) |
| *H04W 76/15* | (2018.01) |
| *H04W 76/27* | (2018.01) |

(52) U.S. Cl.
CPC ........... *H04W 72/51* (2023.01); *H04L 5/0051* (2013.01); *H04W 72/0453* (2013.01); *H04W 76/15* (2018.02); *H04W 76/27* (2018.02)

(58) Field of Classification Search
CPC ..... H04W 72/51; H04W 76/15; H04W 76/27; H04W 72/0453; H04L 5/0051
See application file for complete search history.

(56) References Cited

U.S. PATENT DOCUMENTS

| 5,396,647 | A  | * | 3/1995  | Thompson ............ H04W 48/16 |
|           |    |   |         | 455/437                         |
| 10,218,471 | B1 |   | 2/2019 | Kumar et al. |
| 2020/0314793 | A1 |   | 10/2020 | Kumar et al. |
| 2021/0022146 | A1 | * | 1/2021 | Hong ................. H04W 72/51 |
| 2022/0046553 | A1 | * | 2/2022 | Kim .................. H04W 52/245 |

FOREIGN PATENT DOCUMENTS

WO    WO-2020191736 A1 * 10/2020
WO    WO-2020217539 A1 * 10/2020

OTHER PUBLICATIONS

Cewit et al., "Discussion on positioning enhancements for Release 17", 3GPP TSG RAN WG1 103-e e-meeting, Oct. 16-Nov. 13, 2020, R1-2008718 (Year: 2020).*
International Search Report and Written Opinion—PCT/US2021/072081—ISA/EPO—Feb. 14, 2022.

* cited by examiner

*Primary Examiner* — Joseph A Bednash
(74) *Attorney, Agent, or Firm* — Weaver Austin Villeneuve & Sampson LLP

(57) ABSTRACT

In techniques disclosed allow a user equipment (UE) that receives location assistance data to determine a preferred bandwidth part (BWP) with which reference signals from one or more base stations can be measured for position determination of the UE. The selection of the preferred BWP can be based on a determination of the frequency and bandwidth of reference signals to be transmitted by the one or more base stations over the course of a positioning station. The preferred BWP may be the BWP, of a plurality of candidate BWPs, that allows for a desired number of reference signal measurements to be taken without retuning a transceiver of the UE.

24 Claims, 12 Drawing Sheets

USER EQUIPMENT (UE) CENTRIC POSITION TECHNIQUES IN 5G NEW RADIO WITH MULTIPLE BANDWIDTH PARTS

BACKGROUND

In a Fifth Generation (5G) New Radio (NR) mobile communication network, base stations may transmit reference signals that can be measured at a UE to determine the location of the UE using any of a variety of network-based positioning methods. And although these techniques may be similar to those used in Long-Term Evolution (LTE) (or 4G) networks, the ability in 5G to break down a carrier into bandwidth parts (BWPs) is different. Positioning in 5G NR may occur with multiple different configured BWPs, and a base station (an NR NodeB or "gNB") may switch the BWP via downlink control information (DCI) or radio resource control (RRC) during an ongoing positioning session. To measure reference signals across multiple BWPs, the UE may need to retune its transceiver to a target frequency for measurement, which can result in latencies and other inefficiencies.

SUMMARY

An example method for determining a preferred bandwidth part (BWP) for a positioning session at a mobile device, according to this disclosure, comprises determining a frequency and a bandwidth of each of a plurality of reference signals to be transmitted by one or more base stations during the positioning session, based at least in part on assistance data received by the mobile device. The method also includes determining a frequency and a bandwidth of each of a plurality of BWPs, based at least in part on radio receiver configuration (RRC) information received by the mobile device. The method also includes determining the preferred BWP based at least in part on the frequency and the bandwidth of the plurality of the reference signals and the plurality of BWPs. The method also includes sending an indication of the preferred BWP to a serving base station.

An example method of configuring a transceiver of a mobile device for a positioning session, according to this disclosure, comprises determining a frequency and a bandwidth of each of a plurality of reference signals to be transmitted by one or more base stations during the positioning session, based at least in part on assistance data received by the mobile device. The method also includes determining a minimum frequency ($F_{min}$) and maximum frequency ($F_{max}$) that encapsulates the plurality of reference signals used for measurement during the positioning session. The method also includes determining a receiving bandwidth based at least in part on the determined minimum frequency and the determined maximum frequency. The method also includes tuning a transceiver of the mobile device from an active bandwidth part (BWP) to the receiving bandwidth for the positioning session.

An example mobile device, according to this disclosure, comprises a transceiver, a memory, and one or more processing units communicatively coupled with the transceiver and the memory. The one or more processing units are configured to determine a frequency and a bandwidth of each of a plurality of reference signals to be transmitted by one or more base stations during a positioning session, based at least in part on assistance data received by the mobile device. The one or more processing units are further configured to determine a frequency and a bandwidth of each of a plurality of BWPs, based at least in part on radio receiver configuration (RRC) information received by the mobile device, and determine the preferred bandwidth part (BWP) based at least in part on the frequency and the bandwidth of the plurality of the reference signals and the plurality of BWPs. The one or more processing units are also configured to send, via the transceiver, an indication of the preferred BWP to a serving base station.

Another example mobile device, according to this disclosure, comprises, a transceiver, a memory, and one or more processing units communicatively coupled with the transceiver and the memory and configured to determine a frequency and a bandwidth of each of a plurality of reference signals to be transmitted by one or more base stations during a positioning session, based at least in part on assistance data received by the mobile device. The one or more processing units are also configured to determine a minimum frequency (fmin) and maximum frequency (fmax) that encapsulates the plurality of reference signals used for measurement during the positioning session. The one or more processing units are also configured to determine a receiving bandwidth based at least in part on the determined minimum frequency and the determined maximum frequency, and tune the transceiver from an active bandwidth part (BWP) to the receiving bandwidth for the positioning session.

These and other embodiments are described in detail below. For example, other embodiments are directed to systems, devices, and computer readable media associated with methods described herein. Among other advantages, embodiments herein can mitigate degradation in both inter-frequency and now intra-frequency measurement and further reduce latency in accumulating measurements for position fixes.

A better understanding of the nature and advantages of embodiments of the present disclosed may be gained with reference to the following detailed description and the accompanying drawings.

Like reference, symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc., or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following detailed description of example implementations refers to the accompanying drawings. The same reference numbers in different drawings may identify the same or similar elements.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Figure 1:
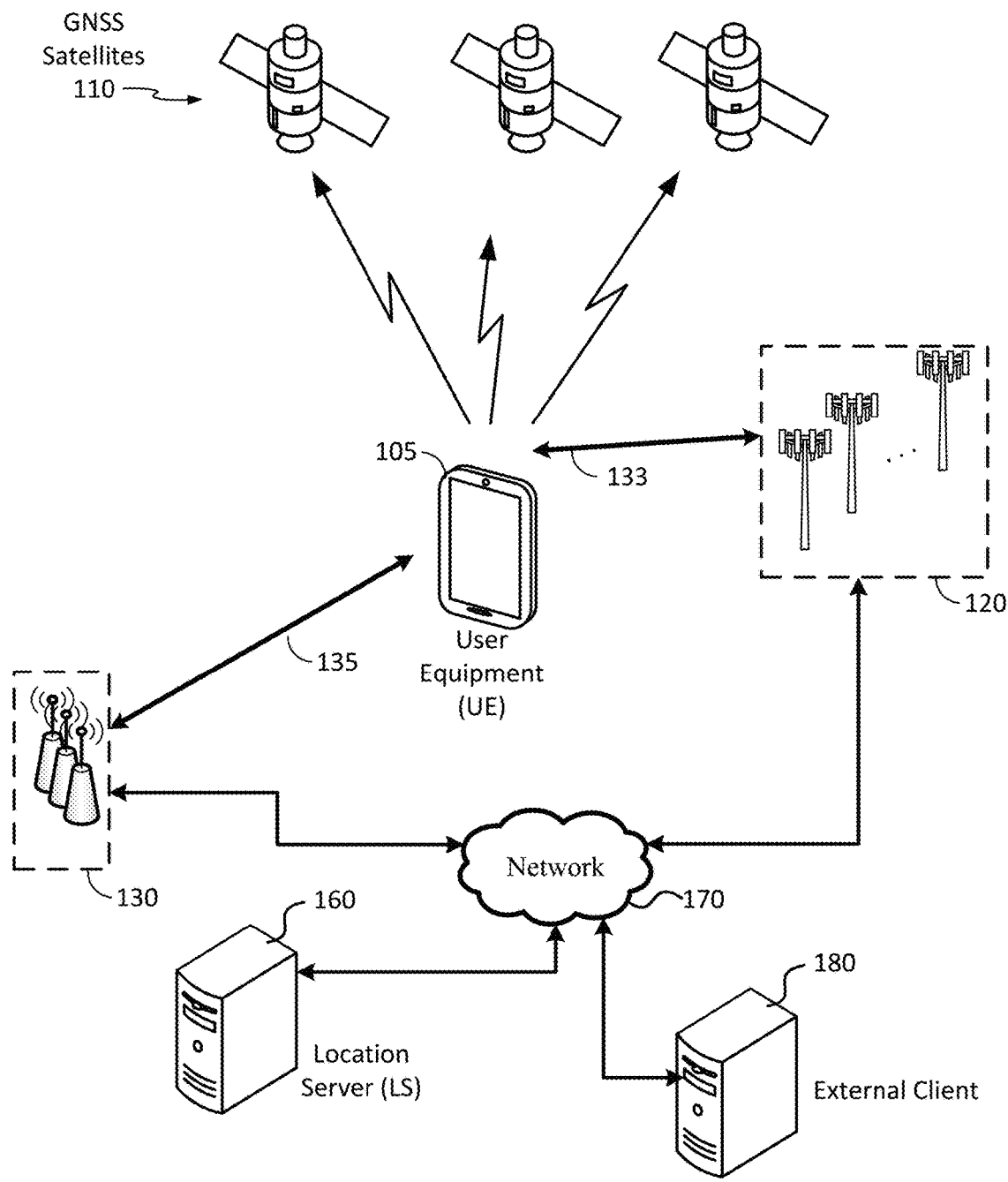
FIG. 1 is a simplified illustration of a positioning system according to an embodiment of the disclosure.

FIG. 1 is a simplified illustration of a positioning system 100 in which a UE 105, location server (LS) 160, and/or other components of the positioning system 100 can use the techniques provided herein for determining and estimated location of UE 105, according to an embodiment. The techniques described herein may be implemented by one or more components of the positioning system 100. The positioning system 100 can include a UE 105, one or more satellites 110 for a Global Navigation Satellite System (GNSS) such as the Global Positioning System (GPS) (also referred to as GNSS space vehicles (SVs)), base stations 120, access points (APs) 130, LS 160, network 170, and an external client 180.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to LS 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Particular examples of network 170 include an LTE wireless network, a 5G NR network (also referred to simply as an NR network), a Wi-Fi WLAN and the Internet. LTE, 5G and NR are wireless technologies defined, or being defined, by the $3^{rd}$ Generation Partnership Project (3GPP). Network 170 may also include more than one network and/or more than one type of network.

The base stations 120 and access points (APs) 130 are communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5G CN) in the case that Network 170 is a 5G network. An AP 130 may comprise a Wi-Fi AP or a Bluetooth® AP, for example. Thus, UE 105 can send and receive information with network-connected devices, such as LS 160, by accessing the network 170 via a base station 120 using a first communication link 133. Additionally or alternatively, because APs 130 also may be communicatively coupled with the network 170, UE 105 may communicate with Internet-connected devices, including LS 160, using a second communication link 135.

The LS 160 may comprise a server and/or other computing device configured to determine an estimated location of UE 105 and/or provide data (e.g., "assistance data") to UE 105 to facilitate the location determination. According to some embodiments, LS 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in LS 160. In some embodiments, the LS 160 may comprise, a Discovered SLP (D-SLP) or an Emergency SLP (E-SLP). The LS 160 may also comprise an Enhanced Serving Mobile Location Center (E-SMLC) that supports location of UE 105 using a control plane (CP) location solution for LTE radio access by UE 105. The LS 160 may further comprise a Location Management Function (LMF) that supports location of UE 105 using a control plane (CP) location solution for 5G or NR radio access by UE 105. In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between LS 160 and UE 105 as data (e.g., data transported using the Internet Protocol (IP) and/or Transmission Control Protocol (TCP)) from the perspective of network 170.

An estimated location of UE 105 can be used in a variety of applications—e.g., to assist direction finding or navigation for a user of UE 105 or to assist another user (e.g., associated with external client 180) to locate UE 105. A "location" is also referred to herein as a "location estimate", "estimated location", "location", "position", "position estimate", "position fix", "estimated position", "location fix" or "fix". A location of UE 105 may comprise an absolute location of UE 105 (e.g., a latitude and longitude and possibly altitude) or a relative location of UE 105 (e.g., a location expressed as distances north or south, east or west and possibly above or below some other known fixed location or some other location such as a location for UE 105 at some known previous time). A location may also be specified as a geodetic location (as a latitude and longitude) or as a civic location (e.g., in terms of a street address or using other location related names and labels). A location may further include an uncertainty or error indication, such as a horizontal and possibly vertical distance by which the location is expected to be in error or an indication of an area or volume (e.g., a circle or ellipse) within which UE 105 is expected to be located with some level of confidence (e.g., 95% confidence).

The external client 180 may be a web server or remote application that may have some association with UE 105 (e.g., may be accessed by a user of UE 105) or may be a server, application, or computer system providing a location service to some other user or users which may include obtaining and providing the location of UE 105 (e.g., to enable a service such as friend or relative finder, asset tracking or child or pet location). Additionally or alternatively, the external client 180 may obtain and provide the location of UE 105 to an emergency services provider, government agency, etc.

Figure 2:
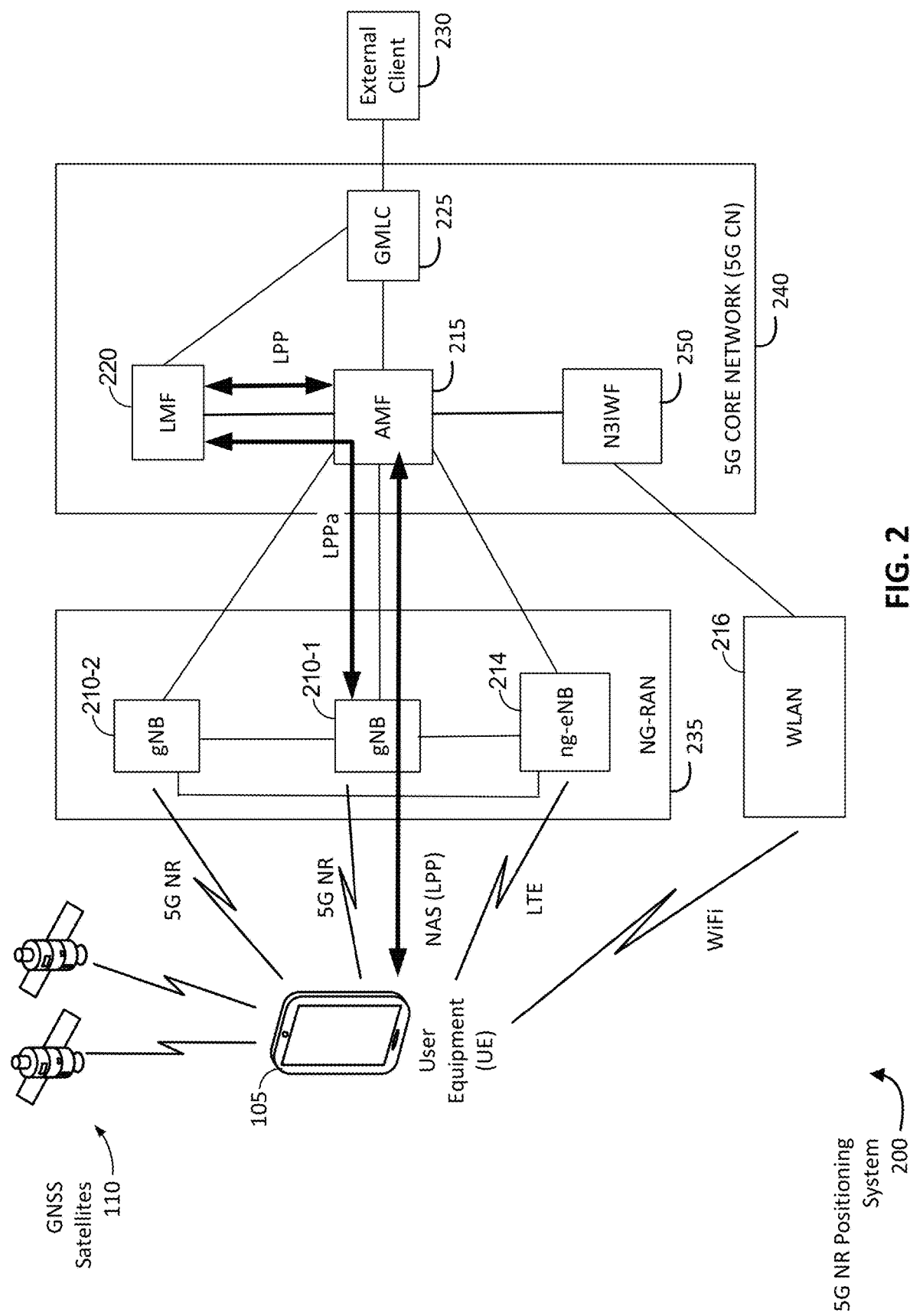
FIG. 2 is a diagram of a positioning system within a 5G NR wireless network, according to an embodiment.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 200) implementing 5G NR. The 5G NR positioning system 200 may be configured to determine the location of a UE 105 by using access nodes (such as gNB 210, ng-eNB 214, WLAN 216, which may correspond with base stations 120 and access points 130 of FIG. 1) and (optionally) an LMF 220 (which may correspond with LS 160) to implement one or more positioning methods. Here, the 5G NR positioning system 200 comprises a UE 105, and components 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. Standardization of an NG-RAN and 5G CN is ongoing in 3GPP. Accordingly, NG-RAN 235 and 5G CN 240 may conform to current or future standards for 5G support from 3GPP. The 5G NR positioning system 200 may further utilize information from GNSS satellites 110 from a GNSS system like Global Positioning System (GPS) or similar system. Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, WLANs 216, Access and Mobility Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long-Term Evolution (LTE), High Rate Packet Data (HRPD), Institute of Electrical and Electronics Engineers (IEEE) 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225).

The UE 105 may include a single entity or may include multiple entities, such as in a personal area network where a user may employ audio, video and/or data Input/Output devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g., for latitude, longitude and altitude above or below mean sea level).

Base stations in the NG-RAN 235 shown in FIG. 2 may correspond to base stations 120 in FIG. 1. As referred to herein, a Transmission Reception Point (TRP), may include NR NodeB (gNB) 210-1 and 210-2 (collectively and generically referred to herein as gNBs 210) and/or an antenna of a gNB, and/or other wireless network nodes of a 5G NR positioning system 200 providing network access to the UE 105. Pairs of gNBs 210 in NG-RAN 235 may be connected to one another—e.g., directly as shown in FIG. 2 or indirectly via other gNBs 210. Access to the 5G network is provided to UE 105 via wireless communication between the UE 105 and one or more of the gNBs 210, which may provide wireless communications access to the 5G CN 240 on behalf of the UE 105 using 5G NR. 5G NR radio access may also be referred to as NR radio access or as 5G radio access. In FIG. 2, the serving gNB for UE 105 is assumed to be gNB 210-1, although other gNBs (e.g., gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB 214. Ng-eNB 214 may be connected to one or more gNBs 210 in NG-RAN 235—e.g., directly or indirectly via other gNBs 210 and/or other ng-eNBs. An ng-eNB 214 may provide LTE wireless access and/or evolved LTE (eLTE) wireless access to UE 105. Some gNBs 210 (e.g., gNB 210-2) and/or ng-eNB 214 in FIG. 2 may be configured to function as positioning-only beacons which may transmit signals (e.g., positioning reference signals (PRS) signals) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214.

The 5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi access points (APs). Here, the N3IWF 250 may connect to other elements in the 5G CN 240 such as Access and Mobility Management Function (AMF) 215. In some embodiments, WLAN 216 may support another Radio Access Technology (RAT) such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support Internet Protocol Security (IPSec) tunnel establishment with UE 105, termination of Internet Key Exchange (IKE) v2/Internet Protocol Security (IPSec) protocols with UE 105, termination of N2 and N3 interfaces to 5G CN 240 for control plane and user plane, respectively, relaying of uplink and downlink control plane Non-Access Stratum (NAS) signaling between UE 105 and AMF 215 across an N1 interface. In some other embodiments, WLAN 216 may connect directly to elements in 5G CN 240 (e.g., AMF 215 as shown by the dashed line in FIG. 2) and not via N3IWF 250—e.g., if WLAN 216 is a trusted WLAN for 5G CN 240. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information for multiple RATs from the LMF 220, take measurements for one of the multiple RATs (e.g., measurements of the UE 105) and/or obtain measurements from the UE 105 that are transferred to the access node using one or more of the multiple RATs. As noted, while FIG. 2 depicts access nodes (such as gNBs 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5G CN 240 in FIG. 2. The methods and techniques described herein for UE 105 positioning using common or generic positioning procedures may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node (such as gNBs 210, ng-eNB 214, or WLAN 216) of a first RAT to an access node (such as gNBs 210, ng-eNB 214, or WLAN 216) of a second RAT. The AMF 215 may also participate in supporting a signaling connection to the UE 105 and possibly data and voice bearers for the UE 105. The LMF 220 may support positioning of the UE 105 when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA), Real Time Kinematics (RTK), Precise Point Positioning (PPP), Differential GNSS (DGNSS), Enhanced Cell identifier (ECID), angle of arrival (AOA), angle of departure (AOD), WLAN positioning, and/or other positioning procedures and methods. The LMF 220 may also process location services requests for the UE 105, e.g., received from the AMF 215 or from the GMLC 225. The LMF 220 may be connected to AMF 215 and/or to GMLC 225. The LMF 220 may be referred to by other names such as a Location Manager (LM), Location Function (LF), commercial LMF (CLMF), or value added LMF (VLMF). In some embodiments, a node/system that implements the LMF 220 may additionally or alternatively implement other types of location-support modules, such as an Evolved Serving Mobile Location Center (E-SMLC) or Service Location Protocol (SLP). It is noted that in some embodiments, at least part of the positioning functionality (including determination of a UE's location) may be performed at the UE 105 (e.g., by processing downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220, or may forward the location request directly to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230. The GMLC 225 is shown connected to both the AMF 215 and LMF 220 in FIG. 2 though only one of these connections may be supported by 5G CN 240 in some implementations.

As further illustrated in FIG. 2, the LMF 220 may communicate with the gNBs 210 and/or with the ng-eNB 214 using the LPPa protocol. LPPa protocol in NR may be the same as, similar to, or an extension of the LPPa protocol in LTE (related to LTE Positioning Protocol (LPP)), with LPPa messages being transferred between a gNB 210 and the LMF 220, and/or between an ng-eNB 214 and the LMF 220, via the AMF 215. As further illustrated in FIG. 2, LMF 220 and UE 105 may communicate using the LPP protocol. LMF 220 and UE 105 may also or instead communicate using an LPP protocol. Here, LPP messages may be transferred between the UE 105 and the LMF 220 via the AMF 215 and a serving gNB 210-1 or serving ng-eNB 214 for UE 105. For example, LPP and/or LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP and/or LPP protocol may be used to support positioning of UE 105 using UE assisted and/or UE based position methods such as A-GNSS, RTK, OTDOA and/or Enhanced Cell ID (ECID). The LPPa protocol may be used to support positioning of UE 105 using network based position methods such as ECID (e.g., when used with measurements obtained by a gNB 210 or ng-eNB 214) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use LPPa and/or LPP to obtain a location of UE 105 in a similar manner to that just described for UE 105 access to a gNB 210 or ng-eNB 214. Thus, LPPa messages may be transferred between a WLAN 216 and the LMF 220, via the AMF 215 and N3IWF 250 to support network-based positioning of UE 105 and/or transfer of other location information from WLAN 216 to LMF 220. Alternatively, LPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using LPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

With a UE-assisted position method, UE 105 may obtain location measurements and send the measurements to an LS (e.g., LMF 220) for computation of a location estimate for UE 105. Location measurements may include one or more of a Received Signal Strength Indication (RSSI), Round Trip signal propagation Time (RTT), Reference Signal Received Power (RSRP), Reference Signal Received Quality (RSRQ), Time of Arrival (TOA), Angle of Arrival (AOA), Differential AoA (DAOA), Angle of Departure (AOD), or Timing Advance (TA) for gNBs 210, ng-eNB 214, and/or one or more access points for WLAN 216. The location measurements may also or instead include measurements of RAT-independent positioning methods such as GNSS (e.g., GNSS pseudorange, GNSS code phase, and/or GNSS carrier phase for satellites 110) WLAN, etc. With a UE based position method, UE 105 may obtain location measurements (e.g., which may be the same as or similar to location measurements for a UE assisted position method) and may further compute a location of UE 105 (e.g., with the help of assistance data received from an LS such as LMF 220 or broadcast by gNBs 210, ng-eNB 214, or WLAN 216). With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AOA, or TOA) for signals transmitted by UE 105, and/or may receive measurements obtained by UE 105 or by an AP in WLAN 216 in the case of N3IWF 250, and may send the measurements to an LS (e.g., LMF 220) for computation of a location estimate for UE 105.

In a 5G NR positioning system 200, some location measurements taken by the UE 105 (e.g., AOA, AOD, TOA) may use RF reference signals received from base stations such as gNB 210 and ng-eNB 214. Such signals may comprise PRS (as previously noted), Cell-specific Reference Signal (CRS), Channel State Information Reference Signal (CSI-RS), synchronization signals (e.g., synchronization signal Block (SSB), etc. Moreover, the signals may be transmitted in a Tx beam (e.g., using beamforming techniques), which may impact angular measurements, such as AOD.

Information provided by the gNBs 210 and/or ng-eNB 214 to the LMF 220 using New Radio Positioning Protocol (NRPPa) may include timing and configuration information for PRS transmission and location coordinates. The LMF 220 can then provide some or all of this information to the UE 105 as assistance data in an LPP message via the NG-RAN 235 and the 5G core network (CN) 240.

An LPP message sent from the LMF 220 to the UE 105 may instruct the UE 105 to do any of a variety of things, depending on desired functionality. For example, the LPP message could contain an instruction for the UE 105 to obtain measurements for GNSS (or A-GNSS), WLAN, OTDOA and/or ECID (or some other position method). In the case of OTDOA, the LPP message may instruct the UE 105 to obtain one or more measurements (e.g., reference signal time difference (RSTD) measurements) of PRS signals transmitted within particular cells supported by particular gNBs 210 and/or ng-eNB 214 (or supported by some other type of base station such as an eNB or Wi-Fi AP). An RSTD measurement may comprise the difference in the times of arrival at the UE 105 of a signal (e.g., a PRS signal) transmitted or broadcast by one gNB 210 and a similar signal transmitted by another gNB 210. The UE 105 may send the measurements back to the LMF 220 in an LPP message (e.g., inside a 5G NAS message) via the serving gNB 210-1 (or serving ng-eNB 214) and the AMF 215.

As noted, while the communication system 200 is described in relation to 5G technology, the communication system 200 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5G Core Network (CN) 240 may be configured to control different air interfaces. For example, in some embodiments, both the NG-RAN 235 and the 5G Core Network (CN) 240 may be replaced by other RANs and other core networks. For example, in an EPS, the NG-RAN 235 may be replaced by an E-UTRAN containing eNBs and the 5G CN 240 may be replaced by an EPC containing a Mobility Management Entity (MME) in place of the AMF 115, an E-SMLC in place of the LMF 220 and a GMLC that may be similar to the GMLC 225. In such an EPS, the E-SMLC may use LPPa in place of NRPPa to send and receive location information to and from the eNBs in the E-UTRAN and may use LPP to support positioning of UE 105. In these other embodiments, generic positioning procedures and methods for a UE 105 could be supported in an analogous manner to that described herein for a 5G network with the difference that functions and procedures described herein for gNBs 210, ng-eNB 214, AMF 215 and LMF 220 could, in some cases, apply instead to other network elements such eNBs, Wi-Fi APs, an MME and an E-SMLC.

To support certain position methods such as OTDOA and transmission of PRS or other signals used in positioning of a UE 105, base stations may be synchronized. In a synchronized network, the transmission timing of gNBs 210 may be synchronized such that each gNB 210 has the same transmission timing as every other gNB 210 to a high level of precision—e.g., 50 nanoseconds or less. Alternatively, the gNBs 210 may be synchronized at a radio frame or subframe level such that each gNB 210 transmits a radio frame or subframe during the same time duration as every other gNB 210 (e.g., such that each gNB 210 starts and finishes transmitting a radio frame or subframe at almost precisely the same times as every other gNB 210), but does not necessarily maintain the same counters or numbering for radio frames or subframes. For example, when one gNB 210 is transmitting a subframe or radio frame with counter or number zero (which may be the first radio frame or subframe in some periodically repeated sequence of radio frames or subframes), another gNB 210 may be transmitting a radio frame or subframe with a different number or counter such as one, ten, one hundred etc.

Synchronization of the transmission timing of ng-eNBs 214 in NG-RAN 235 may be supported in a similar manner to synchronization of gNBs 210, although since ng-eNBs 214 may typically use a different frequency to gNBs 210 (to avoid interference), an ng-eNB 214 may not always be synchronized to gNBs 210. Synchronization of gNBs 210 and ng-eNBs 214 may be achieved using a GPS receiver or a GNSS receiver in each gNB 210 and ng-eNB 214 or by other means such as using the IEEE 1588 Precision Time Protocol.

Figure 3:
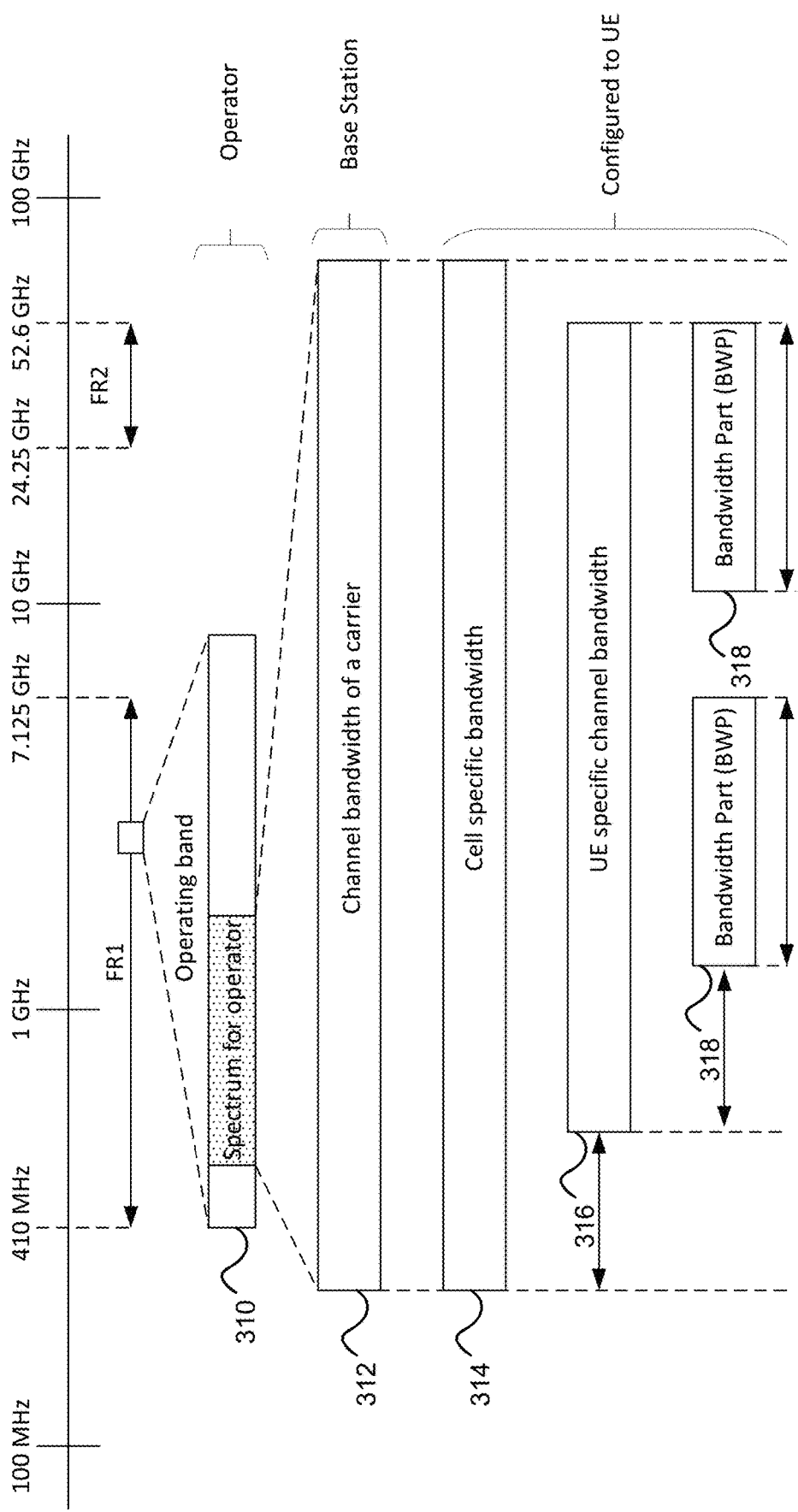
FIG. 3 illustrates an illustration of a 5G NR spectrum and the concept of BWPs.

FIG. 3 illustrates an illustration of a 5G NR spectrum and the concept of BWPs. At a high level, NR defines frequency ranges (FR). In various embodiments, there are two defined frequency ranges. FR1 is from 410 MHz to 7.125 GHz. FR2 is from 24.25 GHz to 52.6 GHz. 3GPP standards define operating bands 310 within each FR. An operating band 310 is a frequency band associated with a set of radio frequency (RF) requirements. Bandwidths of different operating bands 310 can vary from several MHz to a few GHz. Operators are assigned differ amounts of the frequency spectrum within an operating band 310. 5G NR techniques support a range of channel bandwidths from 5 to 400 MHz, where a channel bandwidth 312 refers to the bandwidth of the NR carrier. Base stations and UE can support different channel bandwidths. The cell specific bandwidth 314 can match the channel bandwidth 312 of the carrier. In some cases, the UE bandwidth 316 can be more limited that the cell specific bandwidth 314. The UE can receive information about the channel bandwidth 312 of the cell and the position and width of a BWP 318.

A BWP 318 is a subset or part of a total carrier bandwidth 312. A BWP 318 forms a set of contiguous common resource blocks (CRBs) within the full carrier bandwidth 312. A UE can be configured with up to four downlink BWPs and up to four uplink BWPs for each serving cell. Due to UE battery consumption, only one BWP in the downlink and one in the uplink are active at a given time on an active serving cell. The active BWP defines the UE's operating bandwidth within the cell's operating bandwidth. The non-active BWPs are deactivated and do not transmit or receive data. For Time Division Duplex (TDD), a BWP pair (an active UL BWP and active DL BWP) have the same center frequency. The network can dynamically switch the UE to a desired BWP when the desired BWP is not active.

LTE maximum carrier bandwidth is much smaller to that of NR (20 MHz vs 400 MHz). If an NR UE scanned full carrier bandwidth (e.g., 400 MHz), it may consume an undesirable amount of power. Moreover, with NR supporting multiple UE types and capabilities, not all devices may be capable of receiving the full carrier bandwidth. With this in mind, the use of BWPs reduces UE power consumption for UEs capable of receiving maximum carrier bandwidth. For example, a UE can be configured to use a BWP with a wider bandwidth during large amounts of data transfer while keeping the UE on a BWP with a narrow bandwidth during low data activity periods.

A UE receives Physical Downlink Control Channel (PDCCH) and Physical Downlink Shared Channel (PDSCH) in a DL BWP according to a configured subcarrier spacing (SCS) and cyclic prefix (CP) length for the DL BWP. A UE transmits physical uplink control channel (PUCCH) and physical uplink shared channel (PUSCH) in an UL BWP according to a configured SCS and CP length for the UL BWP. For each serving cell, the network configures at least an initial downlink BWP and one (if the serving cell is configured with an uplink) or two (if using supplementary uplink (SUL)) initial uplink BWPs. Furthermore, the network may configure additional uplink and downlink BWPs for a serving cell. For a primary cell (PCell), the initial BWP is the BWP used for initial access i.e., for initial access and until the UE's configuration in a cell is received, the UE uses the initial BWP which is detected from system information. For secondary cell(s) (SCell(s)), the initial BWP is the BWP configured for the UE to first operate at the time of SCell activation.

The initial DL and UL BWPs are used at least for initial access before radio resource control (RRC) connection is established. An initial BWP has index zero and can be referred to as BWP #0. During the initial access the UE performs cell search based on synchronization signal block (SSB) composed of primary synchronization signal (PSS), secondary synchronization signal (SSS), and physical broadcast channel (PBCH). To access the system, the UE reads system information block 1 (SIB1) which carries information concluding the initial downlink (DL)/uplink (UL) BWP configuration. The SIB1 can be transmitted on the PDSCH, which can be scheduled by downlink control information (DCI) on the PDCCH using the control resource set with index zero (CORESET #0).

Prior to reading the SIB1, the UE's initial DL BWP has the same frequency range and numerology as those of CORESET #0. Following reading SIB1, the UE follows the initial downlink (DL)/uplink (UL) BWP configuration in the SIB1 and uses them to carry out random-access procedure to request the setup of radio communication channel (RCC) connection. The network should configure the frequency domain location and bandwidth of the initial DL BWP in the SIB1 so that the initial DL BWP contains the entire CORESET #0 in the frequency domain.

The first active DL and UL BWPs can be configured for a Special Cell (SpCell) or a secondary cell (SCell). In a master cell group (MCG), the SpCell refers to the primary cell (PCell) in which the UE performs the connection establishment or reestablishment procedure.

The network can configure the UE with a BWP inactivity timer. This timer can indicate that the UE has no scheduled transmission and reception for a while on the active BWP. Following the expiration of the allotted time (e.g., 3 milliseconds to 2.56 seconds) the UE can switch its active BWP to a default BWP to conserve power. The default BWP can be configured to save power.

A UE can be provided by a default DL BWP among the configured DL BWPs. If the network doesn't configure a default DL BWP, the default DL BWP is the initial DL BWP. The network configures defaultDownlinkBWP-Id which is one of the BWP id of already configured downlink BWPs. The UE will switch to this default downlink BWP upon certain amount of inactivity on the current active downlink BWP. The amount of inactivity is controlled by RRC using a timer field bwp-InactivityTimer which range from 3 ms to 2.56 seconds. Upon expiry of this timer, the UE falls back to the default downlink BWP (if configured). These fields are mandatory present for an SCell upon addition. When configured, these fields contain the ID of the downlink/uplink BWP to be used upon media access control (MAC)-activation of an SCell.

The BWP switching procedure for a serving cell is used to activate an inactive BWP and deactivate an active BWP at the same time. In frequency domain duplex (FDD), downlink and uplink can switch BWP independently but for TDD, both downlink and uplink should switch BWP simultaneously.

In some embodiments, the network can impose BWP switching using RRC (re-) configuration. As part of first active BWP section, the network includes firstActiveDownlinkBWP-Id and/or firstActiveUplinkBWP-Id for SpCell or SCell within RRC (re-) configuration. Upon receiving RRC (re-) configuration of firstActiveDownlinkBWP-Id and/or firstActiveUplinkBWP-Id for SpCell, the UE activates the downlink BWP and/or uplink BWP indicated by firstActiveDownlinkBWP-Id and/or firstActiveUplinkBWP-Id respectively. For an SCell, the UE does not activate the downlink BWP and/or uplink BWP immediately after receiving the radio resource control (RRC) Reconfiguration, instead, the activation of the corresponding BWP is done at the time of SCell activation. If the network does not want to impose a BWP switch, the network does not include the field firstActiveDownlinkBWP-Id/firstActiveUplinkBWP-Id in RRC (re-) configuration. The BWP switching can be controlled by the Physical Downlink Control Channel (PDCCH) indicating a downlink assignment or an uplink grant.

The field Bandwidth Part Indicator indicates the BWP in which the frequency resources provided via this DCI are located. This field if configured, can take 1 or 2 bits depending upon the number of uplink (UL)/downlink (DL) BWPs configured by RRC, excluding the initial up-link (UL)/down-link (DL) BWP. If BWP indicator field in DCI format 0_1 indicates an UL BWP different from the currently active UL BWP, the UE shall set the active UL BWP to the UL BWP indicated by this field in the DCI format 0_1. If BWP indicator field in DCI format 1_1 indicates a DL BWP different from the currently active DL BWP, the UE shall set the active DL BWP to the DL BWP indicated by this field in the DCI format 1_1. If a UE does not support active BWP change via DCI, the UE ignores the bit field Bandwidth Part Indicator.

The network may configure an inactivity timer (bwp-InactivityTimer), which is used to switch the active downlink BWP after an amount of inactivity specified by the timer field bwp-InactivityTimer. The expiry of the inactivity timer associated to a cell switches the active BWP to a default BWP configured by the network (if configured). If the default downlink BWP is not configured, the switching happens to initial downlink BWP. The value of bwp-InactivityTimer range from 3 ms to 2.56 seconds. When the network releases the timer configuration, the UE stops the timer without switching to the default BWP. Note that the inactivity timer is used to switch only the downlink BWP but not the uplink BWP.

As previously mentioned, the position of a UE 105 may be determined using measurements of RF signals sent from multiple base stations made by the UE via multiple BWPs. A basic description of how different base stations may be used is provided in FIG. 4

Figure 4:
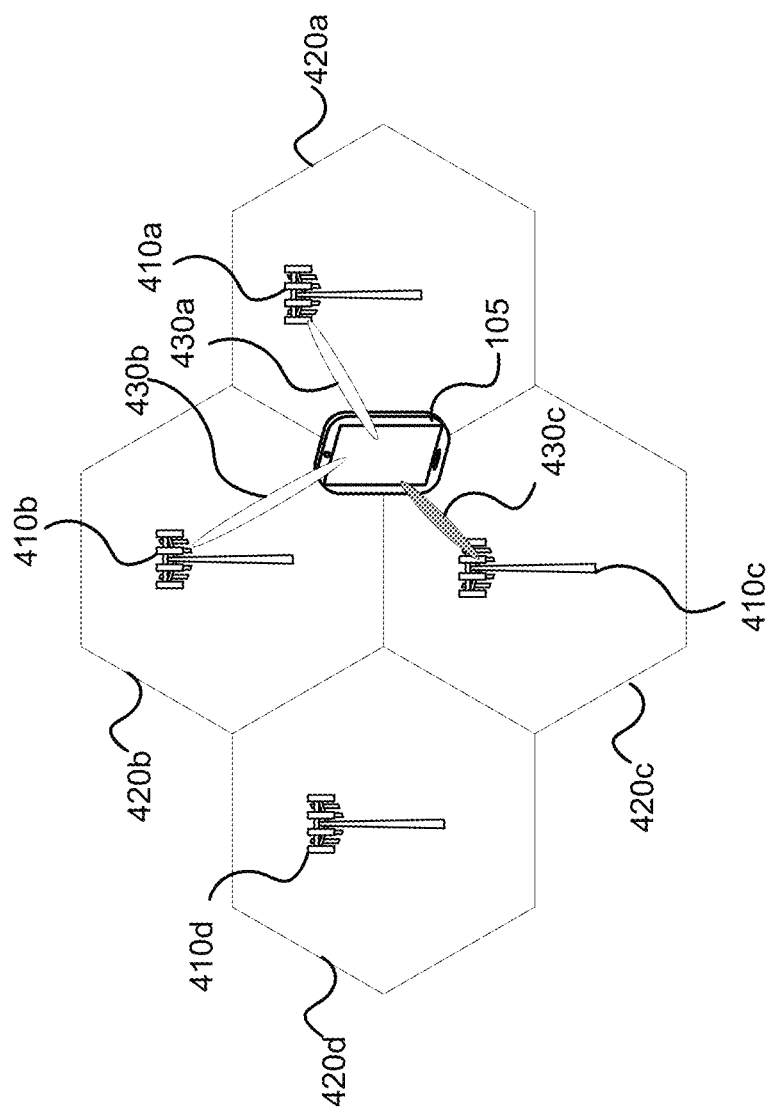
FIG. 4 illustrates aspects of an example 5G NR wireless network.

FIG. 4 illustrates an aspect of an example 5G NR wireless network 400. Wireless network 400 can include a number of base stations 410 (shown as base station 410*a*, base station 410*b*, base station 410*c*, and base station 410*d*. A base station is an entity that communicates with a UE 105 and can also be referred to as a base station, a NR base station, a Node B, a gNB, a 5G node B (NB), an access point, a transmit receive point (TRP), and/or the like. Each base station may provide communication coverage for a particular geographic area. In 3GPP, the term "cell" can refer to a coverage area (shown as 420*a*, 420*b*, 420*c*, and 420*d*) of a base station and/or a base station (shown as 410*a*, 410*b*, 410*c*, and 410*d*) serving this coverage area, depending on the context in which the term is used.

A base station may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A base station for a macro cell may be referred to as a macro BS. A base station for a pico cell may be referred to as a pico BS. A base station for a femto cell may be referred to as a femto BS or a home BS. The terms "eNB", "base station", "BS", "NR BS", "gNB", "TRP", "AP", "node B", "5G NB", and "cell" may be used interchangeably herein.

In some examples, a cell may not necessarily be stationary, and the geographic area of the cell may move according to the location of a mobile base station. In some examples, the base stations may be interconnected to one another and/or to one or more other base stations or network nodes (not shown) in the access network 400 through various types of backhaul interfaces such as a direct physical connection, a virtual network, and/or the like using any suitable transport network.

At base station 120, a transmit processor may receive data from a data source for one or more UEs 105, select one or more modulation and coding schemes (MCS) for each UE 105 based at least in part on channel quality indicators (CQIs) received from the UE 105, process (e.g., encode and modulate) the data for each UE 105 based at least in part on the MCS(s) selected for the UE 105, and provide data symbols for all UEs 105. The Transmit processor (not shown) may also process system information (e.g., for semi-static resource partitioning information (SRPI), etc.) and control information (e.g., CQI requests, grants, upper layer signaling, etc.) and provide overhead symbols and control symbols. The Transmit processor can also generate reference symbols for reference signals 430 (e.g., the CRS) and synchronization signals (e.g., the primary synchronization signal (PSS) and secondary synchronization signal (SSS)).

In a 5G NR system, a base station may transmit a PSS and an SSS on the downlink in the center of the system bandwidth for each cell supported by the base station. The PSS and SSS may be used by UEs for cell search and acquisition. The base station may transmit a CRS across the system bandwidth for each cell supported by the base station. The CRS may be transmitted in certain symbol periods of each subframe and may be used by the UEs to perform channel estimation, channel quality measurement, and/or other functions. The base station may also transmit a physical broadcast channel (PBCH) in symbol periods 0 to 3 in slot 1 of certain radio frames. The PBCH may carry some system information. The base station may transmit other system information such as system information blocks (SIBs) on a physical downlink shared channel (PDSCH) in certain subframes. The base station may transmit control information/data on a physical downlink control channel (PDCCH) in the first B symbol periods of a subframe, where B may be configurable for each subframe. The base station may transmit traffic data and/or other data on the PDSCH in the remaining symbol periods of each subframe.

The UE 105 can receive the reference signals 430, shown as reference signals 430a, 430b, and 430c, transmitted from base stations 410a, 410b, 410c. As depicted in FIG. 4, the UE 105 is at the border of three different cells, specifically 420a, 420b, and 420c. As the UE 105 moves it can transition from one cell to another. The reference signal 430 of each cell 420a, 420b, 420c can operate at a distinct frequency and bandwidth. As noted, the UE 105 can operate with a BWP configuration that specifies up to four BWPs 318 (shown in FIG. 3). For example, the reference signal 430a and reference signal 430b can operate at frequencies within BWP #1 and reference signal 430c and operate at a frequency within BWP #2 that is also outside BWP #1 frequency spectrum. In order to receive reference signal 430c from base station 410c, the transceiver of the UE 105 may need to be re-tuned to BWP #2, which can occur during a Measurement Gap (MG). MGs are time durations during which a UE suspends communication with serving cell to measure an inter-frequency neighbor or other RAT neighbor. MGs may be used if UE 105 is requested to perform measurements which cannot be completed while the UE 105 is tuned to the current serving cell. MGs impact performance because they interrupt both uplink and downlink data transfer. As previously noted, this interruption can result in undesirable latency in the communications.

In the case of 5G NR, MGs may be required for intra-frequency measurements, in addition to inter-frequency measurements. For example, within a particular frequency range (e.g., FR 1), it can be expected that UEs 105 will use analog receiver beamforming. The UE beam may be normally directed toward the serving cell, whereas neighbor cell measurements will require the beam to be directed toward the neighboring cells. MGs may be needed while the UE redirects its beam and temporarily stops transmitting/receiving with the serving cell. A UE 105 can also be configured with an active BWP which does not contain the intra-frequency synchronization signals (SS) and physical broadcast channel (PBCH) Block. In this case, the UE 105 may need to retune its transceiver to receive the intra-frequency SS/PBCH Block. This scenario is similar to re-tuning for inter-frequency measurements.

Figure 5:
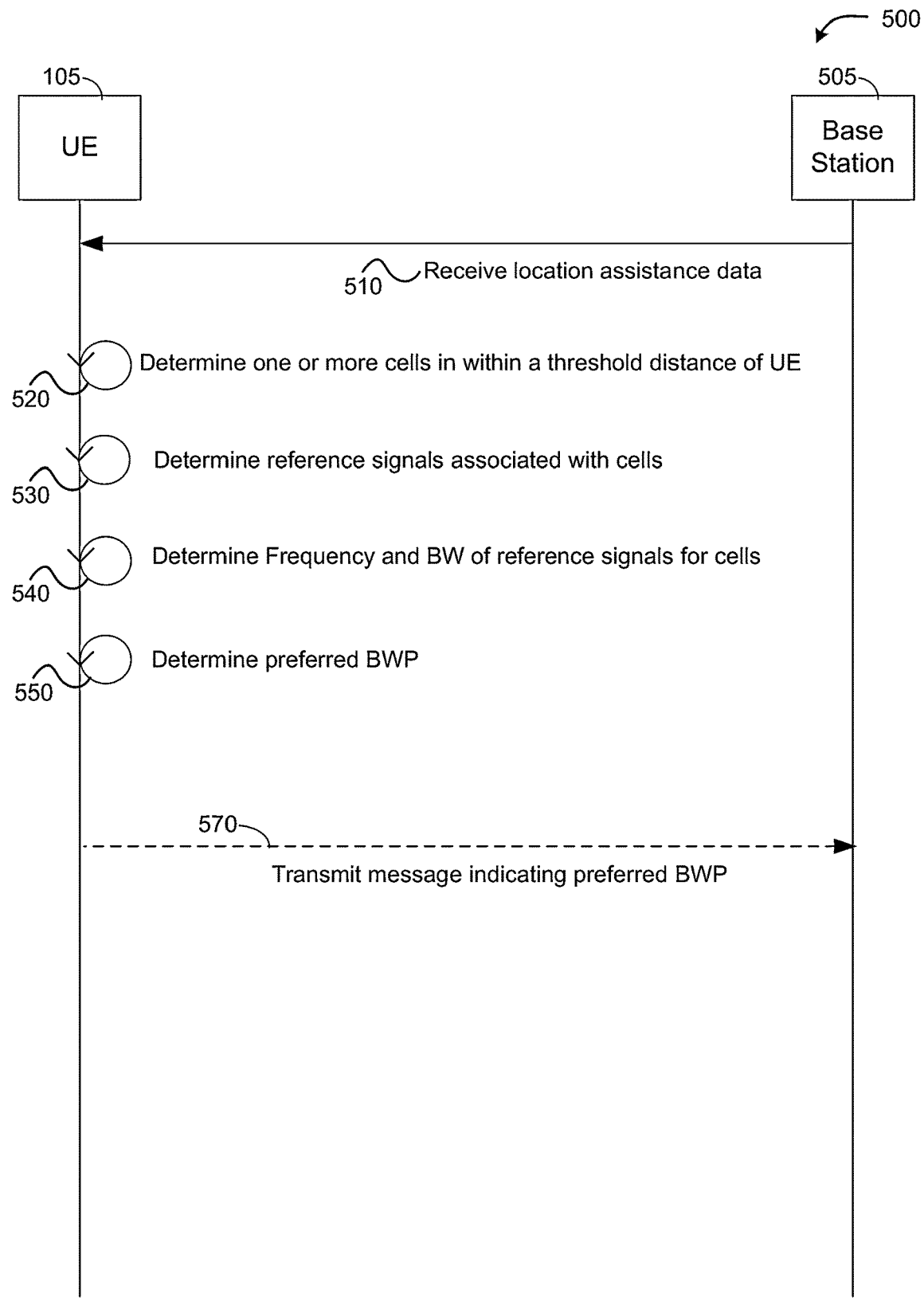
FIG. 5 illustrates a simplified information exchange between a UE and a base station.

According to embodiments herein, a UE may use assistance data and/or other information to determine the frequency domain position (frequency and bandwidth) of reference signals for intra-frequency measurements, determining "preferred BWP" that minimizes the UE's retuning, and indicate the preferred BWP to a base station. The base station and/or network can then determine whether to use the preferred BWP, if possible, for positioning session. FIG. 5 illustrates an example of how this could happen.

Figure 10:
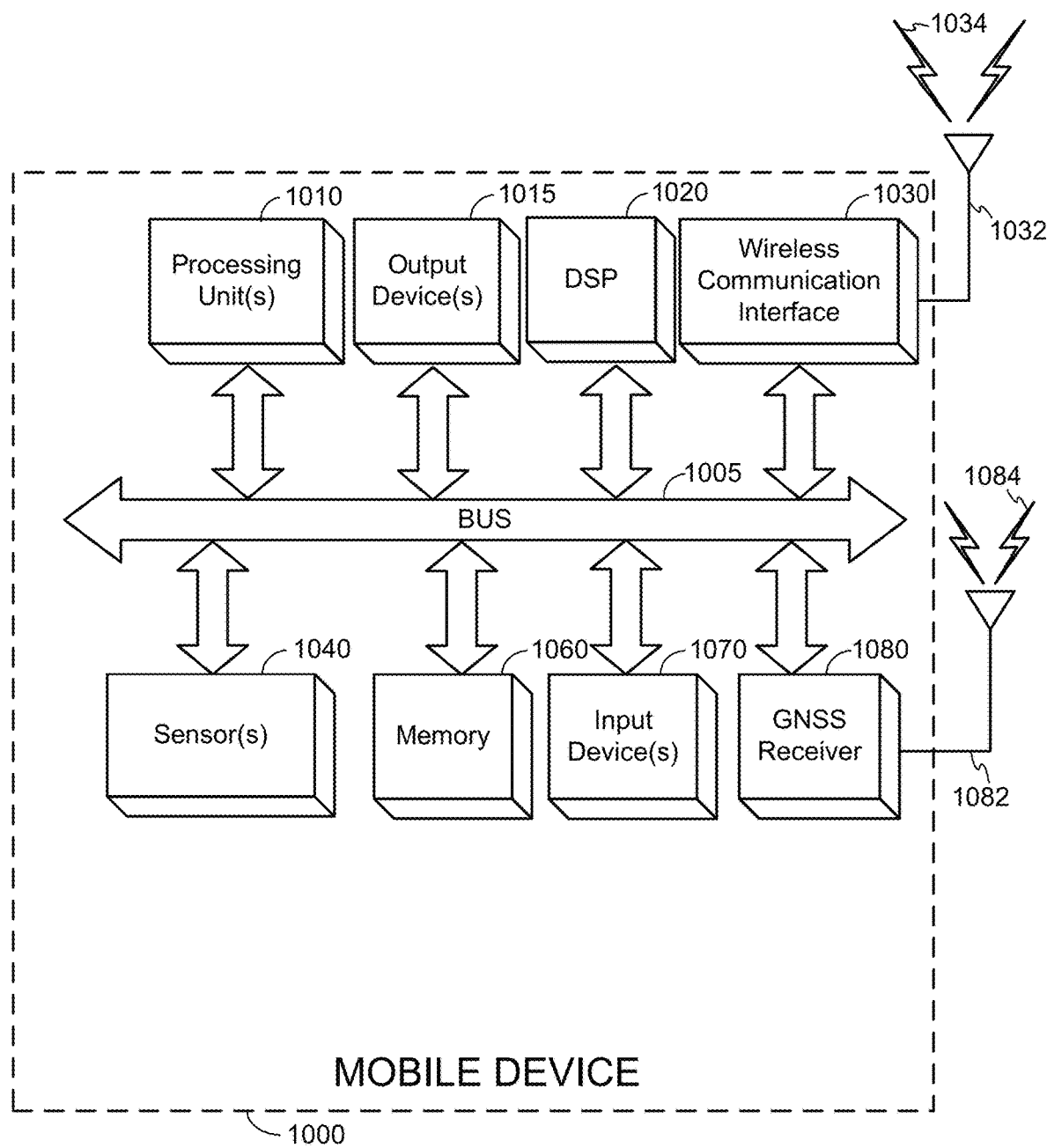
FIG. 10 is a block diagram of an embodiment of a user equipment (UE) device.

FIG. 5 illustrates a simplified information exchange 500 between a UE 105 and a base station 505 (e.g., a gNB 210), which could occur at the beginning of a positioning session, according to an embodiment. At 510, the exchange 500 comprises receiving location assistance data. The assistance data can be broadcast assistance data or dedicated assistance data. The assistance data may be received by the UE 105 (e.g., using processing unit(s) 1010, memory 1060, wireless communication interface 1030, wireless antenna 1032 as shown in FIG. 10, and/or the like).

It is noted that the terms "positioning assistance data", "location assistance data" and "assistance data" (or "AD") are used synonymously herein to refer to data which may be provided to a UE via broadcast (e.g., RRC from a base station) or by point to point means (e.g. from an LS) to assist the mobile device to obtain location measurements (also referred to as positioning measurements) and/or to compute a location estimate from positioning measurements. Assistance data may therefore include location information of nearby base stations, a schedule of reference signals transmitted by the base stations, and the like. With the assistance data, a UE therefore may be capable of determining details regarding reference signals transmitted by nearby base stations (e.g., schedule, frequency, etc.), to further determine a preferred BWP that can help maximize the amount of reference signals received without the need for an MG for retuning purposes. A determination of which base stations are nearby (e.g., within a threshold distance of the UE) may be made based on an approximate location of the UE (e.g., based on information provided by the UE, the location/ coverage area of the serving base station, etc.), the receipt of broadcast signals from the nearby base stations, or both, for example.

As noted, assistance data may be provided via broadcast and/or point-to-point communication between the UE and an LS. In the case of 3GPP control plane location, an LS may be an enhanced serving mobile location center (E-SMLC) in the case of LTE access, a standalone SMLC (SAS) in the case of Universal Mobile Telecommunications Service (UMTS) access, a serving mobile location center (SMLC) in the case of GSM access, or a Location Management Function (LMf) in the case of NR access. In the case of OMA SUPL location, an LS may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

An LS and a base station 505 may exchange messages to enable the LS to (i) obtain position measurements for a particular UE from the base station 505, or (ii) obtain location information from the base station 505 not related to a particular UE, such as the location coordinates of an antenna for the base station 505, the cells (e.g. cell identities) supported by the base station 505, cell timing for the base station 505 and/or parameters for signals transmitted by the base station 505 such as PRS signals. In the case of LTE access, the LPP A (LPPa) protocol defined in 3GPP TS 36.455 may be used to transfer such messages between a base station 505 that is an eNodeB and an LS that is an E-SMLC.

At 520, process 500 may include determining one or more cells within a threshold distance of a location of the UE 105 using the location assistance data. Here, the location of the UE 105 may be an approximate location of the UE is determined (prior to the positioning session) by the UE 105 and/or network. This can be based on a previous position determination, a location or coverage area of a serving base station (e.g., base station 505), or the like. The determination of nearby base stations (within a threshold distance) may be made by the UE 105 and based, for example, on a comparison of the approximate location of the UE 105 with a cellular coverage area map. For example, for UE 105 as shown in FIG. 4, the one of more cells in the vicinity (within a threshold distance) can include cells 420a, 420b, and 420c. Although cell 420d is illustrated, it may not be necessarily within a threshold distance of the UE 105 as depicted. Accordingly, the determination of whether a cell is within a threshold distance may comprise determining whether the UE 105 is within a coverage area of a base station 505. The cellular coverage area map can inform the UE 105 of one or more cells within a threshold distance of a location of the UE 105. According to some embodiments, the UE 105 (e.g., using processing unit(s) 1010, memory 1060, wireless communication interface 1030, wireless antenna 1032 as shown in FIG. 10, and/or the like) can determine one or more cells within a threshold distance of a location of the UE 105 using the location assistance data, as described above.

At 530, process 500 may include determining a plurality of reference signals associated with the one or more cells. As noted, this may be based on the assistance data received from the base station 505 at action 510. That is, using the broadcasted and/or dedicated assistance data, the UE 105 can determine which nearby cells will be broadcasting reference signals (which may be of different types—e.g., PRS, SSB, etc.) during a time period in which reference signal measurements are to be taken during a positioning session. According to some embodiments, the UE 105 (e.g., using processing unit(s) 1010, memory 1060, wireless communication interface 1030, wireless antenna 1032 as shown in FIG. 10, and/or the like) can determine a plurality of reference signals associated with the one or more cells, as described above.

At 540, process 500 may include determining an associated frequency and bandwidth of each of the plurality of reference signals associated with the one or more cells using the radio receiver configuration information. The RRC, for example, can provide the frequency and bandwidth for each of the reference signals associated with the one or more cells. For the above example, cells 420a, 420b, and 420c were determined to be within a threshold distance of UE 105. Therefore, the UE 105 can use information from one or more RRC messages to determine the characteristics (e.g., the frequency and bandwidth) of the reference signals for cells 420a, 420b, and 420c. According to some embodiments, the UE 105 (e.g., using processing unit(s) 1010, memory 1060, wireless communication interface 1030, wireless antenna 1032 as shown in FIG. 10, and/or the like) can determine an associated frequency and bandwidth of each of the plurality of reference signals associated with the one or more cells using the radio receiver configuration information, as described above.

At 550, process 500 may include determining a preferred BWP of a plurality of BWPs based in part on the determined frequency and the bandwidth of the plurality of the reference signals, wherein the preferred BWP is one of the plurality of BWPs in which a majority of positioning measurements occur without re-tuning a transceiver of the UE 105. Using these techniques, the UE 105 can indicate a preferred BWP at the start of the positioning session. Once the positioning session is over, the BWP can change to a preferred BWP based on other considerations or a default BWP. For example, the UE 105 (e.g., using processing unit(s) 1010, memory 1060, wireless communication interface 1030, wireless antenna 1032 as shown in FIG. 10, and/or the like) can determine a preferred BWP of a plurality of BWPs based in part on the determined frequency and the bandwidth of the plurality of the reference signals, as described above. In some implementations, the preferred BWP is the BWP, from among the plurality of BWPs, in which the largest number of positioning measurements can occur without re-tuning a transceiver of the UE 105. As noted, this can result in spectral efficiency and/or increased accuracy.

At 570, the UE 105 can transmit the preferred BWP to the base station 505. In addition, a new "clause" can be defined as "positioning request" that specifies the reason for the BWP preference. The preferred BWP can be stored in memory of the base station 505.

Figure 6:
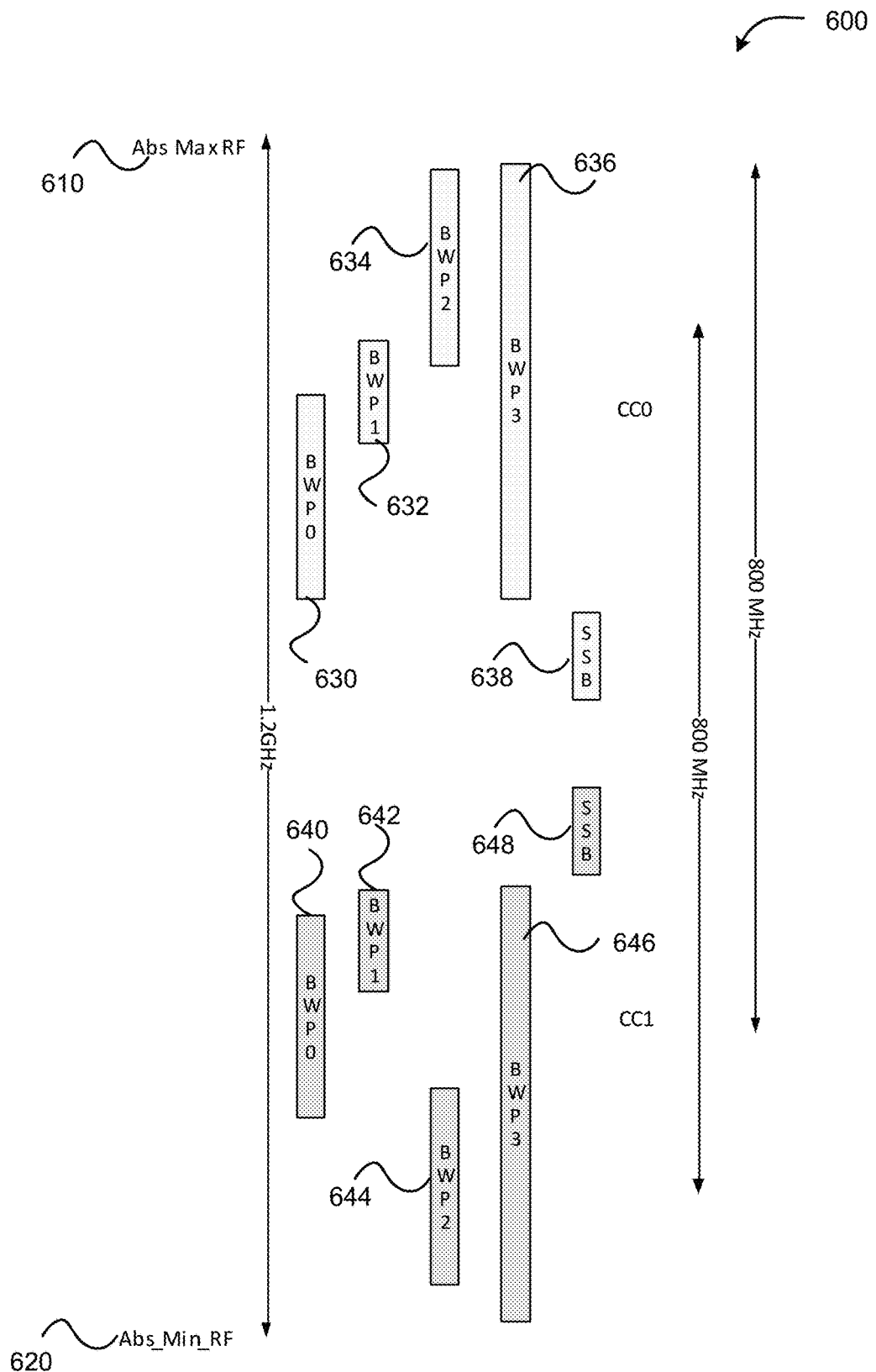
FIG. 6 illustrates another illustration of a 5G NR spectrum and the concept of BWPs.

FIG. 6 illustrates an illustration of a 5G NR spectrum and the concept of BWPs. FIG. 6 illustrates a partial frequency spectrum 600 with a total bandwidth of 1.2 GHz. The partial frequency spectrum 600 includes an absolute maximum radio frequency value 610 and an absolute minimum radio frequency value 620. 5G NR currently can support up to 16 contiguous and non-contiguous component carriers (CCs) and can aggregate new 5G bands up to approximately 1 GHz of spectrum. Dual connectivity allows a UE to simultaneously transmit and receive data on multiple CCs from two cell groups (i.e. a master eNB and secondary eNB). FIG. 6 illustrates a first component carrier (CC0) and a second component carrier (CC1). Each component carrier has an 800 MHz bandwidth.

The first component carrier (CC0) can be configured with four BWPs (BWP0 630, BWP1 632, BWP2 634, and BWP3 636). As shown in FIG. 6, the bandwidth of BWP3 636 overlaps the entire bandwidth for BWP0 630, BWP1 632, and BWP2 634. BWP0 partially overlaps the bandwidth for BWP1. BWP1 632 partially overlaps BWP2 634. No portion of BWP0 630 overlaps BWP2 634. Therefor if BWP2 634 is the active BWP for a UE, and the UE needs to transmit or receive a signal in BWP0 630, the transceiver will need to be re-tuned. The first component carrier (CC0) also includes a Synchronization Signal Block (SSB) 638. The Synchronization Signal (SS) and PBCH are includes in the SSB. The SS includes the Primary Synchronization Signal (PSS), and the Secondary Synchronization Signal (SSS). The Physical Broadcast Channel (PBCH) includes the Demodulation Reference Signal (DRMS) and Physical Broadcast Channel Data.

The second component carrier (CC0) can be configured with four BWPs (BWP0 640, BWP1 642, BWP2 644, and BWP3 646). As shown in FIG. 6, the bandwidth of BWP3 646 overlaps the entire bandwidth for BWP0 640, BWP1 642, and BWP2 644. BWP0 640 partially overlaps the bandwidth for BWP1 642. BWP0 640 partially overlaps BWP2 644. No portion of BWP1 642 overlaps BWP2 644. Therefore if BWP1 642 is the active BWP for a UE, and the UE needs to transmit or receive a signal in BWP2 644, the transceiver will need to be re-tuned. The first component carrier (CC0) also includes a Synchronization Signal Block (SSB) 648.

With this example in mind, embodiments described herein for determining a preferred BWP can allow a UE to determine the preferred BWP based on an amount of reference signals the UE may be able to measure efficiently without the need to retune RF circuitry or use MGs, in the manner described above. The UE can further provide an indication of the preferred BWP to the network, enabling the network to take the preferred BWP into account when designating the BWP to use in a positioning session.

Figure 7:
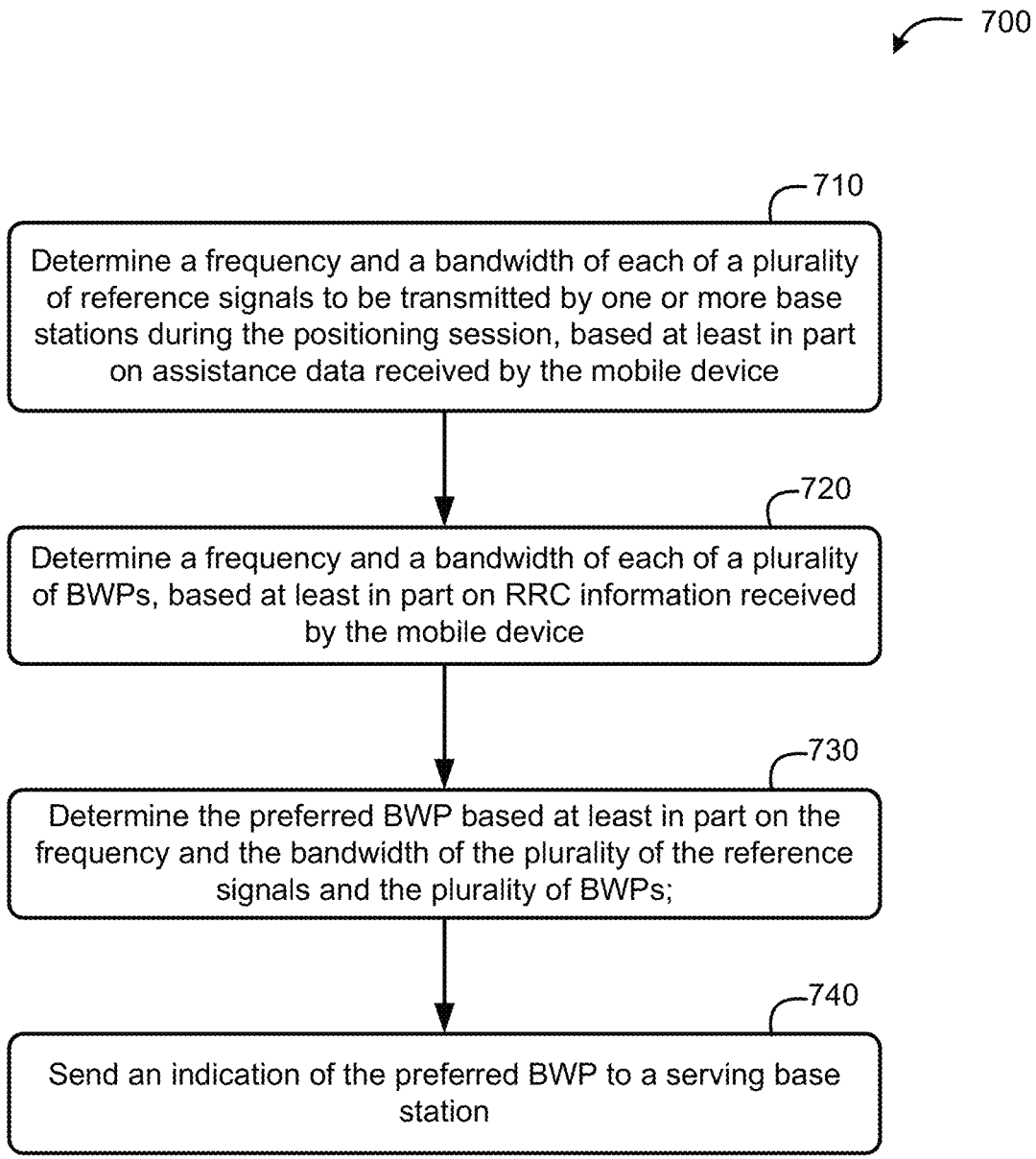
FIG. 7 illustrates a process for determining a preferred BWP for a positioning session at a UE.

FIG. 7 is a flow chart of an example method 700 for determining a preferred BWP for a positioning session at a mobile device, according to an embodiment. The mobile device may correspond with a UE, as described in the embodiments above in relation to FIGS. 1-6. The method 700 is an embodiment that implies the techniques for determining the preferred BWP as described above in relation to FIGS. 3-6. Moreover, it may be seen as a method for implement and the process illustrated in FIG. 5. In some implementations, one or more blocks of FIG. 7 may be performed by a UE 105, another device, or a group of devices separate from or including the UE 105.

At block 710, the method 700 comprises determining a frequency and a bandwidth of each of a plurality of reference signals to be transmitted by one or more base stations during the positioning session, based at least in part on assistance data received by the mobile device. As noted, the assistance data may provide the mobile device with information regarding reference signals transmitted by one or more base stations corresponding to one or more nearby cells. This information can include, for example, the signal type, frequency, schedule, etc. regarding the reference signals. The assistance data may be received from in LS, a serving base station of the mobile device, or both. Moreover, the assistance data may comprise dedicated assistance data (specific to the mobile device), broadcast assistance data (sent to a plurality of devices), or both. The plurality of reference signals may comprise a PRS, a TRS, or an SSB, or any combination thereof. Means for performing the functionality at block 710 can include, for example, processing unit(s) 1010, memory 1060, wireless communication interface 1030, wireless antenna 1032, and/or other components of a mobile device as shown in FIG. 10.

At block 720, method 700 includes determining a frequency and a bandwidth of each of a plurality of BWPs, based at least in part on RRC information received by the mobile device. Each reference signal can have different frequency and bandwidth. The frequency and bandwidth of some reference signals may not fall within the active BWP of the mobile device. Moreover, different reference signals may fall within different BWPs. Means for performing the functionality at block 720 can include, for example, processing unit(s) 1010, memory 1060, wireless communication interface 1030, wireless antenna 1032, and/or other components of a mobile device as shown in FIG. 10.

At block 730, method 700 includes determining the preferred BWP based at least in part on the frequency and the bandwidth of the plurality of the reference signals and the plurality of BWPs. Based on this information, the mobile device can identify which reference signals fall which BWPs. As noted, a larger number of measurements can result in higher accuracy and/or more efficiency in the positioning of the mobile device, and therefore the preferred BWP may be determined based on this number. For example, the preferred BWP may be the BWP having the most measurements. As noted, keeping measurements within a BWP (e.g., the preferred BWP) can reduce the need for MGs, thereby increasing the efficiency of the mobile device. Accordingly, in the method 700, the preferred BWP may comprise a BWP, of the plurality of BWPs, in which the most reference signals of the plurality of reference signals may be measured by the mobile device during the positioning session without retuning a transceiver of the mobile device. In some implementations, the preferred BWP is one of the plurality of BWPs in which a majority of positioning measurements occur without re-tuning a transceiver of the UE 105.

Additional or alternative factors may be considered when determining the preferred BWP. Power savings may be one such factor. For example, because using a BWP with a narrower bandwidth requires less power, a mobile device may favor a BWP with a narrower bandwidth over a BWP with a broader bandwidth, given a similar number of reference signals in each. Self-interference could be another such factor. For example, because of self-interference the mobile device may be less sensitive to reference signals at certain frequencies, resulting in poorer positioning measurements. This can be the case, for example, when the positioning session is being carried out in an E-ULTRA New Radio Dual Connectivity (ENDC) or Non-Standalone (NSA) mode. As such, the mobile device may select the preferred BWP to minimize these reference signals. According to some embodiments of the method 700, therefore, determining the preferred BWP is further based at least in part on a determination of how self-interference at the mobile device may impact one or more of the plurality of reference signals. Means for performing the functionality at block 730 can include, for example, processing unit(s) 1010, memory 1060, wireless communication interface 1030, wireless antenna 1032, and/or other components of a mobile device as shown in FIG. 10.

At block 740, the method 700 may include sending an indication of the preferred BWP to a serving base station. As noted, the serving base station can take into account the preferred BWP when configuring an active BWP for the mobile device to use in the positioning session. Means for performing the functionality at block 740 can include, for example, processing unit(s) 1010, memory 1060, wireless communication interface 1030, wireless antenna 1032, and/or other components of a mobile device as shown in FIG. 10.

Method 700 may include additional implementations, such as any single implementation or any combination of implementations described below and/or in connection with one or more other processes described elsewhere herein.

After the preferred BWP is sent at block 740, a mobile device may perform additional operations related to the preferred BWP, depending on desired functionality. According to some embodiments, for example, a mobile device may further request an on-demand reference signal be sent via the preferred BWP. As such, according to some embodiments, the method 700 may further comprise, subsequent to sending the indication of the preferred BWP to the serving base station, sending a request for a reference signal to the serving base station or an LS, where the reference signal is to be transmitted using the preferred BWP. Further, regardless of whether the preferred BWP is selected as the designated BWP for conducting measurements of reference signals, the mobile device can perform measurements of at least a portion of the plurality of reference signals for positioning purposes. As such, according to some embodiments, the method 700 may further comprise, subsequent to sending the indication of the preferred BWP to the serving base station, receiving, at the mobile device, a configuration indicative of a designated BWP selected based at least in part on the indication of the preferred BWP, and measuring at least a portion of the plurality of reference signals using the designated BWP. That said, in some instances, the designated BWP may, in fact, comprise the preferred BWP.

In various embodiments, multiple reference signals from the one or more base stations may exceed a predetermined threshold of signal strength. The process 700 can include determining whether the plurality of reference signals exceed a predetermined threshold level. If the plurality of the reference signals exceeds a predetermined threshold level, the process 700 can include determining a geometry of arrival for each of the plurality of reference signals originating from the one or more base stations. The process 700 can include determining the preferred BWP of a plurality of BWPs based at least in part on the geometry of arrival of the plurality of the reference signal. The process 700 can include determining the geometry or Geometric dilution of precision (GDOP) based at least in part on the one or more base stations and the respective beams identification signals (IDs). GDOP can be a term used in satellite navigation and geomatics engineering to specify the error propagation as a mathematical effect of navigation satellite geometry on positional measurement precision.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The above-described embodiments enable a mobile device (e.g., UE) to indicate a preferred BWP for positioning session to a network. However, it may ultimately be the network that decides which BWP to use. According to alternative embodiments, a mobile device may be capable of tuning its transceiver to optimize reference signal measurements, without (or regardless of) an active BWP configured by the network.

Figure 8:
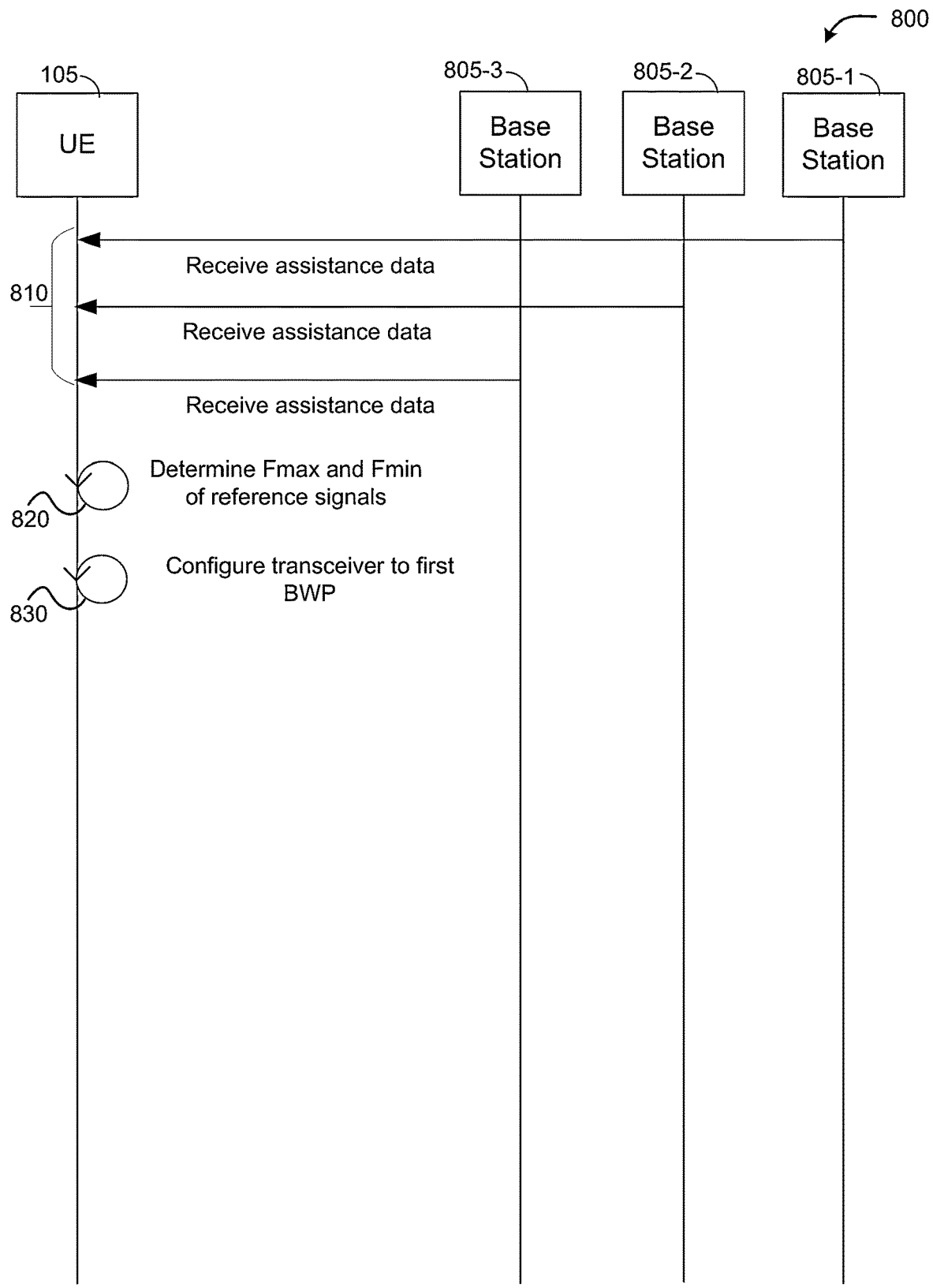
FIG. 8 illustrates a simplified information exchange between a UE and a plurality of base stations.

FIG. 8 illustrates a simplified information exchange between a UE 105 and a plurality of base stations that can allow UE to tune its transceiver in this manner, according to embodiment. Depending on desired functionality, some or all of the operations illustrated in FIG. 8 may be performed before or at the beginning of a positioning session. FIG. 8 illustrates a UE 105 and three base stations (805-1, 805-2, and 805-3; collectively and generically referred to herein as base stations 805). It will be understood, however, that any number of base stations may be used. Moreover, although the example provided in FIG. 8 illustrates a UE 105 receiving assistance data from base stations, embodiments are not so limited. Assistance data additionally or alternatively may be received from a single base station (e.g., a serving base station) and/or and LS 160.

At 810, the UE 105 receives assistance data from the three base stations 805. Because this assistance data is received directly from base stations 820, it may comprise broadcast assistance data indicative of timing, frequency and/or other characteristics of a plurality of reference signals to be transmitted by the base stations 810. As noted, in alternative embodiments the UE 105 may receive dedicated assistance data from a serving base station or LS. With the information from the assistance data, the UE 105 can determine a frequency and bandwidth for each of the reference signals. The frequencies can be stored in a memory of the UE 105.

At 820, the processor of the UE 105 can determine a maximum and a minimum frequency of the plurality of reference signals. In so doing, the UE 105 can determine a receiving bandwidth for the receiving RF circuitry of the UE 105 to use to receive all or a threshold number (or percentage) of the plurality of reference signals. These maximum and minimum frequencies and/or receiving bandwidth can be stored in a memory of the UE 105.

At 830, the processor of the UE 105 can tune its transceiver to the receiving bandwidth. This may involve tuning the transceiver away from an active BWP. In some embodiments, the receiving bandwidth can be less than or equal to a carrier bandwidth that encapsulates all of references signal frequencies. In this way, the transceiver may not need to be retuned during a positioning session to capture all of the plurality of reference signals (or at least the portion of the reference signals that fall within the receiving bandwidth). The UE 105 can either configure or tune the RF and other hardware devices to tune either the whole carrier BW (including all possible configured BWPs) or tune to an optimum BW which is less than or equal to the carrier BW but including all the reference signals. This can be done selectively during an active positioning session to ensure that the UE 105 does not need to be re-tuned, hence no MG may be needed to measure the reference signals.

Once the reference signals are measured and/or the positioning session is complete, the UE 105 can fall back to the default mode, retuning the receiving RF circuitry to the active BWP.

In another embodiment, the determination to either tune to the entire carrier BW or determining an optimal BW based of $F_{min}$ and $F_{max}$ can be based on the UE's current battery charging status where UE 105 could retain the configuration over the entire carrier BW if the device's battery condition is above a certain threshold.

In one embodiment, the techniques can be used to request specific PRS which is confined within the determined preferred BWP. This would help ensure that UE 105 is able to accumulate sufficient number of measurements to for position determination while also ensuring that it a MG is not required to measure intra-frequency RS from different BWPs.

Figure 9:
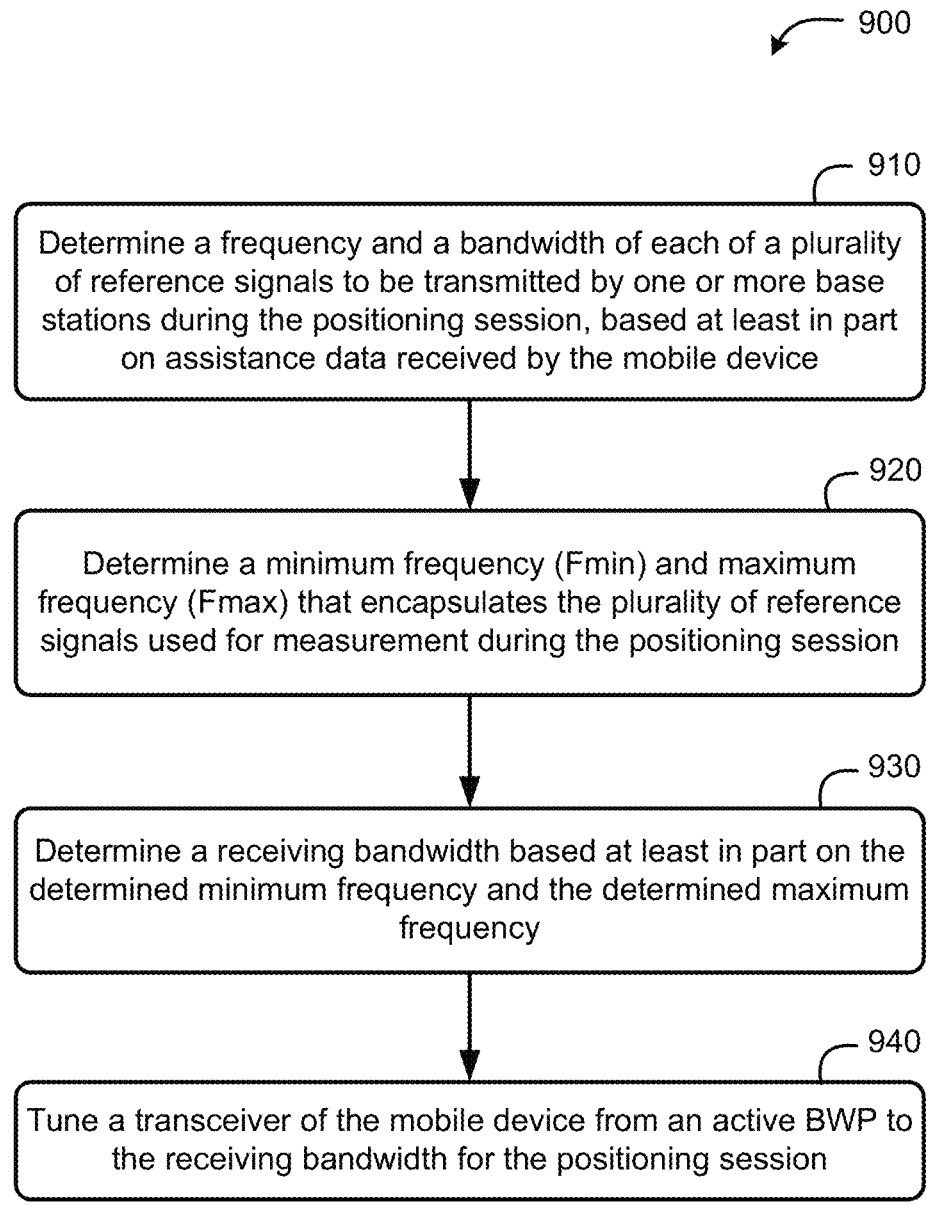
FIG. 9 illustrates a process for configuring a UE to postpone or delay radio frequency (RF) or device reconfiguration.

FIG. 9 illustrates a process of configuring a transceiver of a mobile device (e.g., UE) for a positioning session, according to an embodiment. In this embodiment, the mobile device is tuned to a receiving bandwidth having a frequency spectrum sufficient to measure at least a portion of reference signals transmitted by one or more base stations. In some implementations, one or more process blocks of FIG. 9 may be performed by a mobile device, another device, or a group of devices separate from or including the mobile device. In some embodiments, the positioning session comprises an active positioning session.

At block 910, method 900 may include determining a frequency and a bandwidth of each of a plurality of reference signals to be transmitted by one or more base stations during the positioning session, based at least in part on assistance data received by the mobile device. Similar to the functionality of block 710 in FIG. 10, the assistance data may comprise dedicated assistance data, broadcast assistance data, or both. Moreover, the assistance data may be received from and LS, serving base station, or both. The assistance data may be indicative of the frequency and bandwidth (and optionally other characteristics) of the plurality of reference signals. The reference signals themselves may comprise a PRS, TRS, or SSB, or any combination thereof. Means for performing the functionality at block 910 may include, for example, processing unit(s) 1010, memory 1060, wireless communication interface 1030, wireless antenna 1032, and/or other component of a mobile device as shown in FIG. 10.

At block 920, method 900 may include determine a minimum frequency (Fmin) and maximum frequency (Fmax) that encapsulates the plurality of reference signals used for measurement during the positioning session. Depending on the reference signals' characteristics, this may or may not conform with a particular BWP. Nonetheless, these frequencies may be used to define a receiving bandwidth to use during the positioning session. Means for performing the functionality at block 920 may include, for example, processing unit(s) 1010, memory 1060, wireless communication interface 1030, wireless antenna 1032, and/or other component of a mobile device as shown in FIG. 10.

At block 930, method 900 may include determining a receiving bandwidth based at least in part on the determined minimum frequency and the determined maximum frequency. As noted, the receiving bandwidth may not necessarily be associated with a particular BWP. However, it may be used by the mobile device to measure all or a threshold amount of the reference signals. In some embodiments, for example, the receiving bandwidth may be less than or equal to a carrier bandwidth that encapsulates the plurality of reference signals. Additional factors such as battery power, accuracy requirements, and the like may be considered when determining a receiving bandwidth. A larger amount of available battery power, for example, may allow the mobile device to use the entire spectrum defined by the determined minimum frequency and determined maximum frequency. Less available battery power may result in using a portion of this spectrum. Accordingly, in alternative embodiments of method 900, the receiving bandwidth is further based at least in part on a battery charge status of the mobile device. The receiving bandwidth may be determined to include an entire carrier bandwidth, for example, if the battery charge status is above a threshold value. Means for performing the functionality at block 930 may include, for example, processing unit(s) 1010, memory 1060, wireless communication interface 1030, wireless antenna 1032, and/or other component of a mobile device as shown in FIG. 10.

At block 940, the functionality comprises tuning a transceiver of the mobile device (e.g., RF circuitry of the transceiver) from an active BWP to the receiving bandwidth for the positioning session. Once the mobile device measures the reference signals, the original tuning of the transceiver can be restored. Accordingly, some embodiments of the method 900 may further comprise returning the transceiver of the mobile device to the active bandwidth after the positioning session is complete. Means for performing the functionality at block 940 may include, for example, processing unit(s) 1010, memory 1060, wireless communication interface 1030, wireless antenna 1032, and/or other component of a mobile device as shown in FIG. 10.

Method 900 may include additional implementations, such as any single implementation or any combination of implementations described below and/or in connection with one or more other processes described elsewhere herein.

Although FIG. 9 shows example blocks of method 900, in some implementations, method 900 may include additional blocks, fewer blocks, different blocks, or differently arranged blocks than those depicted in FIG. 9. Additionally, or alternatively, two or more of the blocks of method 900 may be performed in parallel.

FIG. 10 illustrates an embodiment of a mobile device 1000, which can be utilized as described herein above with regard to the functionality of a mobile device or UE (e.g., in association with FIGS. 1-9). For example, the mobile device 1000 can perform one or more of the functions of the method shown in FIGS. 7 and 9. It should be noted that FIG. 10 is meant only to provide a generalized illustration of various components, any or all of which may be utilized as appropriate. It can be noted that, in some instances, components illustrated by FIG. 10 can be localized to a single physical device and/or distributed among various networked devices, which may be disposed at different physical locations. Furthermore, as previously noted, the functionality of the UE described in the previously described embodiments may be executed by one or more of the hardware and/or software components illustrated in FIG. 10.

The mobile device 1000 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as digital signal processor (DSP) chips, graphics acceleration processors, application specific integrated circuits (ASICs), and/or the like), and/or other processing structures or means. As shown in FIG. 10, some embodiments may have a separate DSP 1020, depending on desired functionality. Location determination and/or other determinations based on wireless communication may be provided in the processing unit(s) 1010 and/or wireless communication interface 1030 (discussed below). The mobile device 1000 also can include one or more input devices 1070, which can include without limitation a keyboard, touch screen, a touch pad, microphone, button(s), dial(s), switch(es), and/or the like; and one or more output devices 1015, which can include without limitation a display, light emitting diode (LED), speakers, and/or the like.

The mobile device 1000 may also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile device 1000 to communicate with other devices as described in the embodiments above. The wireless communication interface 1030 may permit data and signaling to be communicated (e.g., transmitted and received) with a network, for example, via eNBs, gNBs, ng-eNBs, access points, various base stations and/or other access node types, TRPs, and/or other network components, computer systems, and/or any other electronic devices described herein. The communication can be carried out via one or more wireless communication antenna(s) 1032 that send and/or receive wireless signals 1034. According to some embodiments, the wireless communication antenna(s) 1032 may comprise a plurality of discrete antennas, antenna arrays, or any combination thereof.

Depending on desired functionality, the wireless communication interface 1030 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile device 1000 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) network, and so on. A CDMA network may implement one or more RATs such as Code Division Multiple Access (CDMA) 2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, 6G, and so on. 5G NR, LTE, LTE Advanced, GSM, and WCDMA are described in documents from 3GPP. Cdma2000 is described in documents from a consortium named "3rd Generation Partnership Project 2" (3GPP2). 3GPP and 3GPP2 documents are publicly available. A WLAN may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 1000 can further include sensor(s) 1040. Sensors 1040 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information, as described herein.

Embodiments of the mobile device 1000 may also include a Global Navigation Satellite System (GNSS) receiver 1080 capable of receiving signals 1084 from one or more GNSS satellites using an antenna 1082 (which could be the same as antenna 1032). Positioning based on GNSS signal measurement can be utilized to complement and/or incorporate the techniques described herein. The GNSS receiver 1080 can extract a position of the mobile device 1000, using conventional techniques, from GNSS satellites 110 of a GNSS system, such as Global Positioning System (GPS), Galileo, GLObal NAvigation Satellite System (GLONASS), Quasi-Zenith Satellite System (QZSS) over Japan, Indian Regional Navigational Satellite System (IRNSS) over India, Beidou over China, and/or the like. Moreover, the GNSS receiver 1080 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

The mobile device 1000 may further include and/or be in communication with a memory 1060. The memory 1060 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the mobile device 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the mobile device 1000 (and/or processing unit(s) 1010 or DSP 1020 within mobile device 1000). In an aspect, then such code and/or instructions can be used to configure and/or adapt a general purpose computer (or other device) to perform one or more operations in accordance with the described methods.

Figure 11:
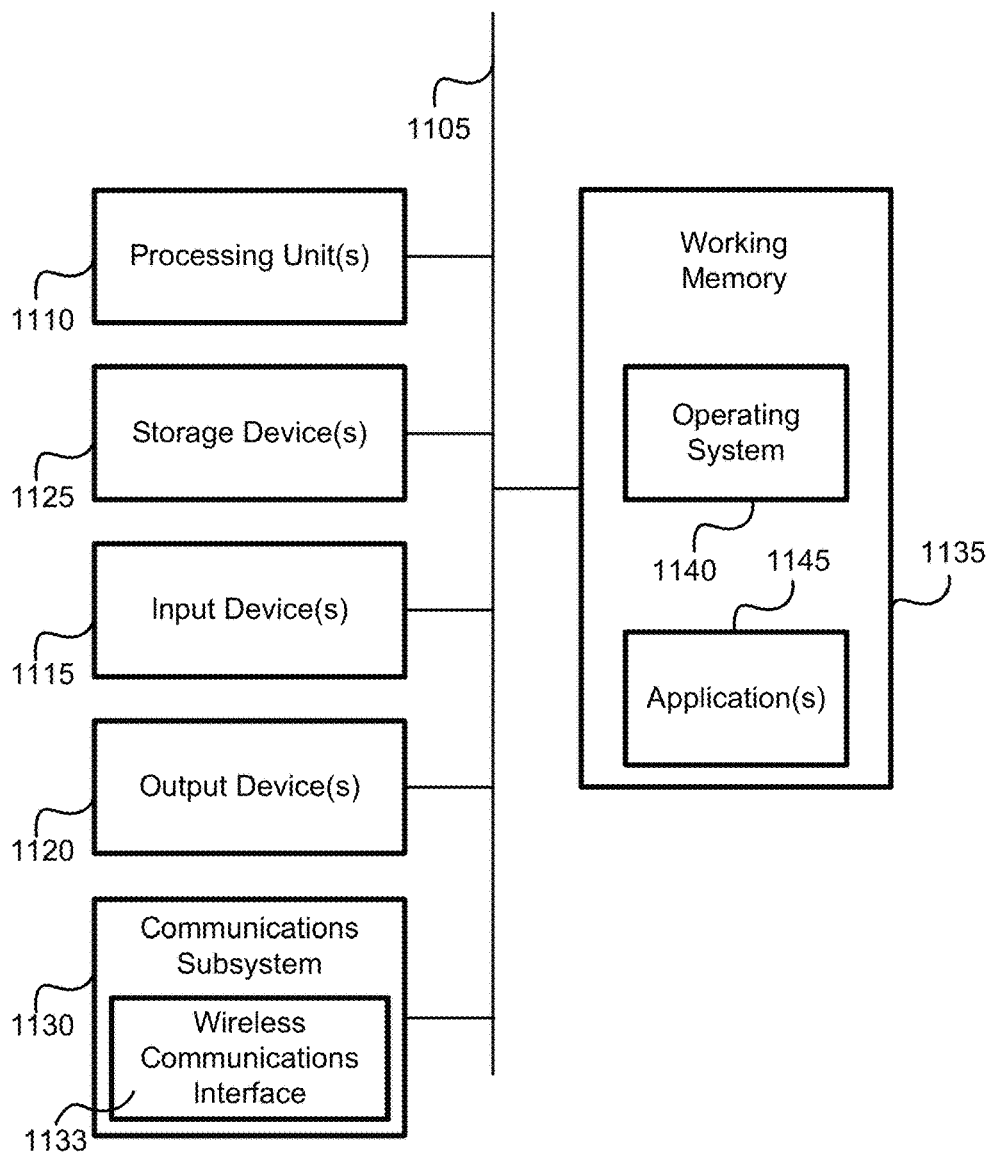
FIG. 11 is a block diagram of an embodiment of a computer system (e.g., a server).

FIG. 11 illustrates an embodiment of a computer system 1100, which may be utilized and/or incorporated into one or more components of a communication system (e.g., location server (LS) 160 of FIG. 1), including various components of a 5G network, such as the LMF 220, AMF 215, and/or similar components. FIG. 11 provides a schematic illustration of one embodiment of a computer system 1100 that can perform the methods provided by various other embodiments, such as the methods described in relation to FIGS. 1-8. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner. In addition, it can be noted that components illustrated by FIG. 11 can be localized to a single device and/or distributed among various networked devices, which may be disposed at different physical or geographical locations.

The computer system 1100 is shown comprising hardware elements that can be electrically coupled via a bus 1105 (or may otherwise be in communication, as appropriate). The hardware elements may include processing unit(s) 1110, which can include without limitation one or more general-purpose processors, one or more special-purpose processors (such as digital signal processing chips, graphics acceleration processors, and/or the like), and/or other processing structure, which can be configured to perform one or more of the methods described herein, including the method described in relation to FIG. 11. The computer system 1100 also can include one or more input devices 1115, which can include without limitation a mouse, a keyboard, a camera, a microphone, and/or the like; and one or more output devices 1120, which can include without limitation a display device, a printer, and/or the like.

The computer system 1100 may further include (and/or be in communication with) one or more non-transitory storage devices 1125, which can comprise, without limitation, local and/or network accessible storage, and/or can include, without limitation, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The computer system 1100 may also include a communications subsystem 1130, which can include support of wireline communication technologies and/or wireless communication technologies (in some embodiments) managed and controlled by a wireless communication interface 1133. The communications subsystem 1130 may include a modem, a network card (wireless or wired), an infrared communication device, a wireless communication device, and/or a chipset, and/or the like. The communications subsystem 1130 may include one or more input and/or output communication interfaces, such as the wireless communication interface 1133, to permit data and signaling to be exchanged with a network, mobile devices, other computer systems, and/or any other electronic devices described herein. Note that the terms "mobile device" and "UE" are used interchangeably herein to refer to any mobile communications device such as, but not limited to, mobile phones, smartphones, wearable devices, mobile computing devices (e.g., laptops, PDAs, tablets), embedded modems, and automotive and other vehicular computing devices.

In many embodiments, the computer system 1100 will further comprise a working memory 1135, which can include a RAM and/or or ROM device. Software elements, shown as being located within the working memory 1135, can include an operating system 1140, device drivers, executable libraries, and/or other code, such as application(s) 1145, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 11, may be implemented as code and/or instructions that are stored (e.g. temporarily) in working memory 1135 and are executable by a computer (and/or a processing unit within a computer such as processing unit(s) 1110); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1125 described above. In some cases, the storage medium might be incorporated within a computer system, such as computer system 1100. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

Figure 12:
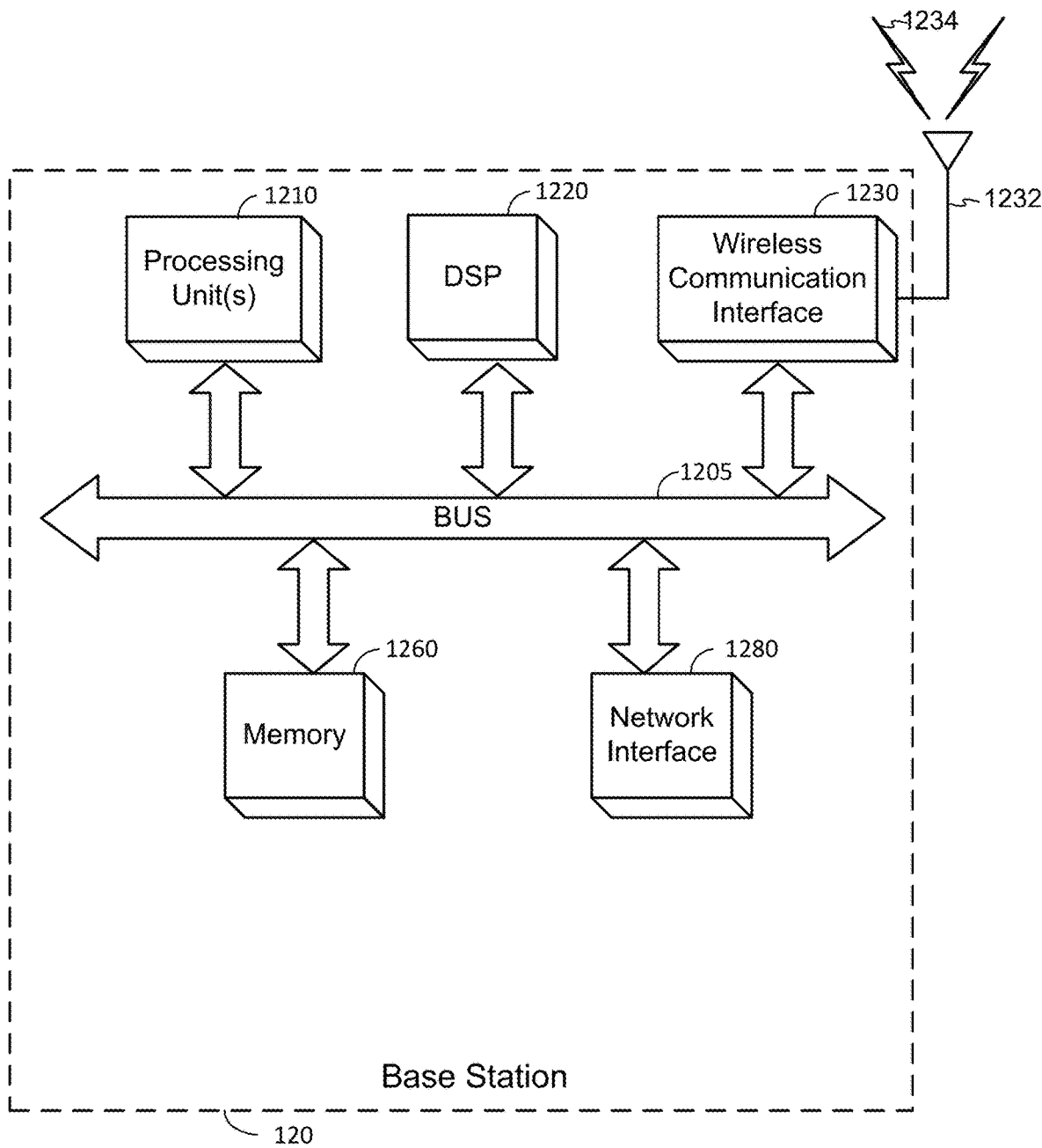
FIG. 12 is a block diagram of an embodiment of a base station.

FIG. 12 illustrates an embodiment of a base station 120, which can be utilized as described herein above (e.g., in association with FIGS. 1-10). It should be noted that FIG. 12 is meant only to provide a generalized illustration of various components, any or all of which may be utilized as appropriate. In some embodiments, the base station 120 may correspond to a gNB, an ng-eNB, and/or (more generally) a TRP.

The base station 120 is shown comprising hardware elements that can be electrically coupled via a bus 1205 (or may otherwise be in communication, as appropriate). The hardware elements may include a processing unit(s) 1210 which can include without limitation one or more general-purpose processors, one or more special-purpose processors (such as DSP chips, graphics acceleration processors, ASICs, and/or the like), and/or other processing structure or means. As shown in FIG. 12, some embodiments may have a separate DSP 1220, depending on desired functionality. Location determination and/or other determinations based on wireless communication may be provided in the processing unit(s) 1210 and/or wireless communication interface 1230 (discussed below), according to some embodiments. The base station 120 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 120 might also include a wireless communication interface 1230, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 120 to communicate as described herein. The wireless communication interface 1230 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1232 that send and/or receive wireless signals 1234.

The base station 120 may also include a network interface 1280, which can include support of wireline communication technologies. The network interface 1280 may include a modem, network card, chipset, and/or the like. The network interface 1280 may include one or more input and/or output communication interfaces to permit data to be exchanged with a network, communication network servers, computer systems, and/or any other electronic devices described herein.

In many embodiments, the base station 120 may further comprise a memory 1260. The memory 1260 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1260 of the base station 120 also may comprise software elements (not shown in FIG. 12), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1260 that are executable by the base station 120 (and/or processing unit(s) 1210 or DSP 1220 within base station 120). In an aspect, then such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, etc. Common forms of computer-readable media include, for example, magnetic and/or optical media, any other physical medium with patterns of holes, a RAM, a programmable ROM (programmable read-only memory (PROM)), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of steps may be undertaken before, during, or after the above elements are considered.

In view of this description embodiments may include different combinations of features. Implementation examples are described in the following numbered clauses:

Clause 1: A method for determining a preferred bandwidth part (BWP) for a positioning session at a mobile device, the method comprising:
- determining a frequency and a bandwidth of each of a plurality of reference signals to be transmitted by one or more base stations during the positioning session, based at least in part on assistance data received by the mobile device;
- determining a frequency and a bandwidth of each of a plurality of BWPs, based at least in part on radio receiver configuration (RRC) information received by the mobile device;
- determining the preferred BWP based at least in part on the frequency and the bandwidth of the plurality of the reference signals and the plurality of BWPs; and
- sending an indication of the preferred BWP to a serving base station.

Clause 2: The method of clause 1, wherein the preferred BWP comprises a BWP, of the plurality of BWPs, in which the most reference signals of the plurality of reference signals may be measured by the mobile device during the positioning session without retuning a transceiver of the mobile device.

Clause 3: The method of clause 1, further comprising:
- determining the plurality of reference signals exceeds a threshold level of signal strength; and
- responsive to determining the plurality of reference signals exceeds the threshold level of signal strength, determining a geometry of arrival for each of the plurality of reference signals originating from the one or more base stations;
- wherein determining the preferred BWP of a plurality of BWPs is further based at least in part on the geometry of arrival of the plurality of the reference signals.

Clause 4: The method of any of clauses 1-3, wherein determining the preferred BWP is further based at least in part on a determination of how self-interference at the mobile device may impact one or more of the plurality of reference signals.

Clause 5: The method of clause 4, wherein the positioning session is carried out in an E-ULTRA New Radio Dual Connectivity (ENDC) or Non-Standalone (NSA) mode.

Clause 6: The method of any of clauses 1-5, wherein the plurality of reference signals comprise:
- a positioning reference signal (PRS),
- a tracking reference signal (TRS), or
- a synchronization signal block (SSB), or
- any combination thereof.

Clause 7: The method of clause any of clauses 1-6, wherein the assistance data is received from a location server (LS), the serving base station, or both.

Clause 8: The method of clause any of clauses 1-7, wherein the assistance data comprises dedicated assistance data, broadcast assistance data, or both.

Clause 9: The method of clause any of clauses 1-8, further comprising, subsequent to sending the indication of the preferred BWP to the serving base station, sending a request for a reference signal to the serving base station or an LS; wherein the reference signal is to be transmitted using the preferred BWP.

Clause 10: The method of any of clauses 1-9, further comprising, subsequent to sending the indication of the preferred BWP to the serving base station:
- receiving, at the mobile device, a configuration indicative of a designated BWP selected based at least in part on the indication of the preferred BWP; and
- measuring at least a portion of the plurality of reference signals using the designated BWP.

Clause 11: The method of Clause 10, wherein the designated BWP comprises the preferred BWP.

Clause 12: A method of configuring a transceiver of a mobile device for a positioning session, the method comprising:
- determining a frequency and a bandwidth of each of a plurality of reference signals to be transmitted by one or more base stations during the positioning session, based at least in part on assistance data received by the mobile device;
- determining a minimum frequency ($F_{min}$) and maximum frequency ($F_{max}$) that encapsulates the plurality of reference signals used for measurement during the positioning session;
- determining a receiving bandwidth based at least in part on the determined minimum frequency and the determined maximum frequency; and
- tuning a transceiver of the mobile device from an active bandwidth part (BWP) to the receiving bandwidth for the positioning session.

Clause 13: The method of clause 12, wherein the receiving bandwidth is less than or equal to a carrier bandwidth that encapsulates the plurality of reference signals.

Clause 14: The method of clause 12 or clause 13, wherein the positioning session comprises an active positioning session.

Clause 15: The method of any of clauses 12-14, further comprising retuning the transceiver of the mobile device to the active BWP after the positioning session is complete.

Clause 16: The method of any of clauses 12-15, wherein the receiving bandwidth is further based at least in part on a battery charge status of the mobile device.

Clause 17: The method of any of clauses 12 or 14-16, wherein the receiving bandwidth is determined to include an entire carrier bandwidth if the battery charge status is above a threshold value.

Clause 18: The method of any of clauses 12-17, wherein the plurality of reference signals comprise:
- a positioning reference signal (PRS),
- a tracking reference signal (TRS), or
- a synchronization signal Block (SSB), or
- any combination thereof.

Clause 19: The method of any of clauses 12-18, wherein the assistance data is received from a location server (LS), a serving base station, or both.

Clause 20: The method of any of clauses 12-19, wherein the assistance data comprises dedicated assistance data, broadcast assistance data, or both.

Clause 21: The method of any of clauses 12-20, further comprising, sending a request for a reference signal to be transmitted using the receiving bandwidth; wherein the request is sent from the mobile device to a serving base station or an LS.

Clause 22: A mobile device comprising:
  a transceiver;
  a memory; and
  one or more processing units communicatively coupled with the transceiver and the memory and configured to:
    determine a frequency and a bandwidth of each of a plurality of reference signals to be transmitted by one or more base stations during a positioning session, based at least in part on assistance data received by the mobile device;
    determine a frequency and a bandwidth of each of a plurality of bandwidth parts (BWP)s, based at least in part on radio receiver configuration (RRC) information received by the mobile device;
    determine a preferred BWP based at least in part on the frequency and the bandwidth of the plurality of the reference signals and the plurality of BWPs; and
    send, via the transceiver, an indication of the preferred BWP to a serving base station.

Clause 23: The mobile device of clause 22, wherein, to determine the preferred BWP, the one or more processing units are configured select the preferred BWP, from of the plurality of BWPs, as the BWP having the most reference signals of the plurality of reference signals that may be measured by the mobile device during the positioning session without retuning the transceiver of the mobile device.

Clause 24: The mobile device of clause 22, wherein the one or more processing units are further configured to:
  determine the plurality of reference signals exceeds a threshold level of signal strength; and
  responsive to determining the plurality of reference signals exceeds the threshold level of signal strength, determine a geometry of arrival for each of the plurality of reference signals originating from the one or more base stations;
  wherein the one or more processing units are configured to further base the determination of the preferred BWP of a plurality of BWPs at least in part on the geometry of arrival of the plurality of the reference signals.

Clause 25: The mobile device of any of clauses 22-24, wherein the one or more processing units are configured to further base the determination of the preferred BWP of a plurality of BWPs at least in part on a determination of how self-interference at the mobile device may impact one or more of the plurality of reference signals.

Clause 26: The mobile device of clause 25, wherein the one or more processing units are configured to carry out the positioning session in an E-ULTRA New Radio Dual Connectivity (ENDC) or Non-Standalone (NSA) mode.

Clause 27: The mobile device of any of clauses 22-26, wherein the plurality of reference signals comprise:
  a positioning reference signal (PRS),
  a tracking reference signal (TRS), or
  a synchronization signal block (SSB), or
  any combination thereof.

Clause 28: The mobile device of any of clauses 22-27, wherein the assistance data is received from a location server (LS), the serving base station, or both.

Clause 29: The mobile device of any of clauses 22-28, wherein the assistance data comprises dedicated assistance data, broadcast assistance data, or both.

Clause 30: The mobile device of any of clauses 22-29, wherein the one or more processing units are further configured to, subsequent to sending the indication of the preferred BWP to the serving base station, send, via the transceiver, a request for a reference signal to the serving base station or an LS; wherein the reference signal is to be transmitted using the preferred BWP.

Clause 31: The mobile device of any of clauses 22-30, wherein the one or more processing units are further configured to, subsequent to sending the indication of the preferred BWP to the serving base station:
  receive, via the transceiver, a configuration indicative of a designated BWP selected based at least in part on the indication of the preferred BWP; and
  measure, with the transceiver, at least a portion of the plurality of reference signals using the designated BWP.

Clause 32: The mobile device of claim 31, wherein the designated BWP comprises the preferred BWP.

Clause 33: A mobile device comprising:
  a transceiver;
  a memory; and
  one or more processing units communicatively coupled with the transceiver and the memory and configured to:
    determine a frequency and a bandwidth of each of a plurality of reference signals to be transmitted by one or more base stations during a positioning session, based at least in part on assistance data received by the mobile device;
    determine a minimum frequency ($F_{min}$) and maximum frequency ($F_{max}$) that encapsulates the plurality of reference signals used for measurement during the positioning session;
    determine a receiving bandwidth based at least in part on the determined minimum frequency and the determined maximum frequency; and
    tune the transceiver from an active bandwidth part (BWP) to the receiving bandwidth for the positioning session.

Clause 34: The mobile device of clause 33, wherein the receiving bandwidth is less than or equal to a carrier bandwidth that encapsulates the plurality of reference signals.

Clause 35: The mobile device of clause 33 or clause 34, wherein the positioning session comprises an active positioning session.

Clause 36: The mobile device of any of clauses 33-35, wherein the one or more processing units are further configured to retune the transceiver of the mobile device to the active BWP after the positioning session is complete.

Clause 37: The mobile device of any of clauses 33-36, wherein the one or more processing units are further configured to determine receiving bandwidth based at least in part on a battery charge status of the mobile device.

Clause 38: The mobile device of any of clauses 33 or 35-37, wherein the one or more processing units are further configured to determine the receiving bandwidth to include an entire carrier bandwidth if the battery charge status is above a threshold value.

Clause 39: The mobile device of any of clauses 33-38, wherein the plurality of reference signals comprise:
  a positioning reference signal (PRS),
  a tracking reference signal (TRS), or
  a synchronization signal Block (SSB), or
  any combination thereof.

Clause 40: The mobile device of any of clauses 33-39, wherein the assistance data is received from a location server (LS), a serving base station, or both.

Clause 41: The mobile device of any of clauses 33-40, wherein the assistance data comprises dedicated assistance data, broadcast assistance data, or both.

Clause 42: The mobile device of any of clauses 33-41, wherein the one or more processing units are further configured to send a request for a reference signal to be transmitted using the receiving bandwidth, wherein the request is sent from the mobile device to a serving base station or an LS.

Clause 43: A device for determining a preferred bandwidth part (BWP) for a positioning session at a mobile device, the device comprising:
  means for determining a frequency and a bandwidth of each of a plurality of reference signals to be transmitted by one or more base stations during the positioning session, based at least in part on assistance data received by the mobile device;
  means for determining a frequency and a bandwidth of each of a plurality of BWPs, based at least in part on radio receiver configuration (RRC) information received by the mobile device;
  means for determining the preferred BWP based at least in part on the frequency and the bandwidth of the plurality of the reference signals and the plurality of BWPs; and sending an indication of the preferred BWP to a serving base station.

Clause 44: The device of clause 43, wherein the preferred BWP comprises a BWP, of the plurality of BWPs, in which the most reference signals of the plurality of reference signals may be measured by the mobile device during the positioning session without retuning a transceiver of the mobile device.

Clause 45: The device of clause 43, further comprising:
  means for determining the plurality of reference signals exceeds a threshold level of signal strength; and
  means for determining, responsive to determining the plurality of reference signals exceeds the threshold level of signal strength, a geometry of arrival for each of the plurality of reference signals originating from the one or more base stations;
  wherein determining the preferred BWP of a plurality of BWPs is further based at least in part on the geometry of arrival of the plurality of the reference signals.

Clause 46: The device of any of clauses 43-45, wherein determining the preferred BWP is further based at least in part on a determination of how self-interference at the mobile device may impact one or more of the plurality of reference signals.

Clause 47: The device of clause 46, wherein the positioning session is carried out in an E-ULTRA New Radio Dual Connectivity (ENDC) or Non-Standalone (NSA) mode.

Clause 48: The device of any of clauses 43-47, wherein the plurality of reference signals comprise:
  a positioning reference signal (PRS),
  a tracking reference signal (TRS), or
  a synchronization signal block (SSB), or
  any combination thereof.

Clause 49: The device of any of clauses 43-48, wherein the assistance data is received from a location server (LS), the serving base station, or both.

Clause 50: The device of any of clauses 43-49, wherein the assistance data comprises dedicated assistance data, broadcast assistance data, or both.

Clause 51: The device of any of clauses 43-50, further comprising means for sending, subsequent to sending the indication of the preferred BWP to the serving base station, a request for a reference signal to the serving base station or an LS; wherein the reference signal is to be transmitted using the preferred BWP.

Clause 52: A device of configuring a transceiver of a mobile device for a positioning session, the device comprising:
  means for determining a frequency and a bandwidth of each of a plurality of reference signals to be transmitted by one or more base stations during the positioning session, based at least in part on assistance data received by the mobile device;
  means for determining a minimum frequency ($F_{min}$) and maximum frequency ($F_{max}$) that encapsulates the plurality of reference signals used for measurement during the positioning session;
  means for determining a receiving bandwidth based at least in part on the determined minimum frequency and the determined maximum frequency; and
  means for tuning a transceiver of the mobile device from an active bandwidth part (BWP) to the receiving bandwidth for the positioning session.

Clause 53: The device of clause 52, wherein the receiving bandwidth is less than or equal to a carrier bandwidth that encapsulates the plurality of reference signals.

Clause 54: The device of clause 52 or clause 53, wherein the positioning session comprises an active positioning session.

Clause 55: The device of any of clauses 52-54, further comprising means for retuning the transceiver of the mobile device to the active BWP after the positioning session is complete.

Clause 56: The device of any of clauses 52-55, wherein the receiving bandwidth is further based at least in part on a battery charge status of the mobile device.

Clause 57: The device of any of clauses 52 or 54-56, wherein the receiving bandwidth is determined to include an entire carrier bandwidth if the battery charge status is above a threshold value.

Clause 58: The device of any of clauses 52-57, wherein the plurality of reference signals comprise:
  a positioning reference signal (PRS),
  a tracking reference signal (TRS), or
  a synchronization signal Block (SSB), or
  any combination thereof.

Clause 59: The device of any of clauses 52-58, wherein the assistance data is received from a location server (LS), a serving base station, or both.

Clause 60: The device of any of clauses 52-59, wherein the assistance data comprises dedicated assistance data, broadcast assistance data, or both.

Clause 61: The device of any of clauses 52-60, further comprising means for sending a request for a reference signal to be transmitted using the receiving bandwidth; wherein the request is sent from the mobile device to a serving base station or an LS.

Clause 62: A non-transitory computer-readable medium storing instructions for determining a preferred bandwidth part (BWP) for a positioning session at a mobile device, the instructions comprising code for:
  determining a frequency and a bandwidth of each of a plurality of reference signals to be transmitted by one or more base stations during the positioning session, based at least in part on assistance data received by the mobile device;

determining a frequency and a bandwidth of each of a plurality of BWPs, based at least in part on radio receiver configuration (RRC) information received by the mobile device;

determining the preferred BWP based at least in part on the frequency and the bandwidth of the plurality of the reference signals and the plurality of BWPs; and sending an indication of the preferred BWP to a serving base station.

Clause 63: The non-transitory computer-readable medium of clause 62, wherein the preferred BWP comprises a BWP, of the plurality of BWPs, in which the most reference signals of the plurality of reference signals may be measured by the mobile device during the positioning session without retuning a transceiver of the mobile device.

Clause 64: The non-transitory computer-readable medium of clause 62, wherein the instructions further comprise code for:

determining the plurality of reference signals exceeds a threshold level of signal strength; and responsive to determining the plurality of reference signals exceeds the threshold level of signal strength, determining a geometry of arrival for each of the plurality of reference signals originating from the one or more base stations;

wherein determining the preferred BWP of a plurality of BWPs is further based at least in part on the geometry of arrival of the plurality of the reference signals.

Clause 65: The non-transitory computer-readable medium of any of clauses 62-64, wherein determining the preferred BWP is further based at least in part on a determination of how self-interference at the mobile device may impact one or more of the plurality of reference signals.

Clause 66: The non-transitory computer-readable medium of clause 65, wherein the positioning session is carried out in an E-ULTRA New Radio Dual Connectivity (ENDC) or Non-Standalone (NSA) mode.

Clause 67: The non-transitory computer-readable medium of any of clauses 62-66, wherein the plurality of reference signals comprise:
a positioning reference signal (PRS),
a tracking reference signal (TRS), or
a synchronization signal block (SSB), or
any combination thereof.

Clause 68: The non-transitory computer-readable medium of any of clauses 62-67, wherein the assistance data is received from a location server (LS), the serving base station, or both.

Clause 69: The non-transitory computer-readable medium of any of clauses 62-68, wherein the assistance data comprises dedicated assistance data, broadcast assistance data, or both.

Clause 70: The non-transitory computer-readable medium of any of clauses 62-69, wherein the instructions further comprise code for, subsequent to sending the indication of the preferred BWP to the serving base station, sending a request for a reference signal to the serving base station or an LS; wherein the reference signal is to be transmitted using the preferred BWP.

Clause 71: A non-transitory computer-readable medium storing instructions for configuring a transceiver of a mobile device for a positioning session, the instructions comprising code for:

determining a frequency and a bandwidth of each of a plurality of reference signals to be transmitted by one or more base stations during the positioning session, based at least in part on assistance data received by the mobile device; determining a minimum frequency ($F_{min}$) and maximum frequency ($F_{max}$) that encapsulates the plurality of reference signals used for measurement during the positioning session;

determining a receiving bandwidth based at least in part on the determined minimum frequency and the determined maximum frequency; and tuning a transceiver of the mobile device from an active bandwidth part (BWP) to the receiving bandwidth for the positioning session.

Clause 72: The non-transitory computer-readable medium of clause 71, wherein the receiving bandwidth is less than or equal to a carrier bandwidth that encapsulates the plurality of reference signals.

Clause 73: The non-transitory computer-readable medium of clause 71 or clause 72, wherein the positioning session comprises an active positioning session.

Clause 74: The non-transitory computer-readable medium of any of clauses 71-73, wherein the instructions further comprise code for retuning the transceiver of the mobile device to the active BWP after the positioning session is complete.

Clause 75: The non-transitory computer-readable medium of any of clauses 71-74, wherein the receiving bandwidth is further based at least in part on a battery charge status of the mobile device.

Clause 76: The non-transitory computer-readable medium of any of clauses 71 or 73-75, wherein the receiving bandwidth is determined to include an entire carrier bandwidth if the battery charge status is above a threshold value.

Clause 77: The non-transitory computer-readable medium of any of clauses 71-76, wherein the plurality of reference signals comprise:
a positioning reference signal (PRS),
a tracking reference signal (TRS), or
a synchronization signal Block (SSB), or
any combination thereof.

Clause 78: The non-transitory computer-readable medium of any of clauses 71-77, wherein the assistance data is received from a location server (LS), a serving base station, or both.

Clause 79: The non-transitory computer-readable medium of any of clauses 71-78, wherein the assistance data comprises dedicated assistance data, broadcast assistance data, or both.

Clause 80: The non-transitory computer-readable medium of any of clauses 71-79, wherein the instructions further comprise code for sending a request for a reference signal to be transmitted using the receiving bandwidth; wherein the request is sent from the mobile device to a serving base station or an LS.

What is claimed is:

1. A method for determining a preferred bandwidth part (BWP) for a positioning session at a mobile device, the method comprising:

determining a frequency and a bandwidth of each of a plurality of reference signals to be transmitted by one or more base stations during the positioning session, based at least in part on assistance data received by the mobile device;

determining, with the mobile device, a frequency and a bandwidth of each of a plurality of BWPs, based at least in part on radio receiver configuration (RRC) information received by the mobile device;

determining a signal strength of each reference signal of the plurality of reference signals exceeds a threshold level of signal strength;

responsive to determining the signal strength of each reference signal of the plurality of reference signals exceeds the threshold level of signal strength, determining a geometry of arrival for each of the plurality of reference signals originating from the one or more base stations;

determining, with the mobile device, the preferred BWP based at least in part on:
- the frequency and the bandwidth of the plurality of the reference signals,
- the frequency and the bandwidth of the plurality of BWPs, and
- a geometric dilution of precision of the geometry of arrival of the plurality of the reference signals; and sending an indication of the preferred BWP to a serving base station.

2. The method of claim 1, wherein determining the preferred BWP is additionally based on a number of measurements of reference signals of the plurality of reference signals that may be measured by the mobile device using the preferred BWP during the positioning session without retuning a transceiver of the mobile device.

3. The method of claim 1, wherein the positioning session is carried out in an E-ULTRA New Radio Dual Connectivity (ENDC) or Non-Standalone (NSA) mode.

4. The method of claim 1, wherein the plurality of reference signals comprise:
- a positioning reference signal (PRS),
- a tracking reference signal (TRS), or
- a synchronization signal block (SSB), or
- any combination thereof.

5. The method of claim 1, wherein the assistance data is received from a location server (LS), the serving base station, or both.

6. The method of claim 1, wherein the assistance data comprises dedicated assistance data, broadcast assistance data, or both.

7. The method of claim 1, further comprising, subsequent to sending the indication of the preferred BWP to the serving base station, sending a request for a reference signal to the serving base station or an LS; wherein the reference signal is to be transmitted using the preferred BWP.

8. The method of claim 1, further comprising, subsequent to sending the indication of the preferred BWP to the serving base station:
- receiving, at the mobile device, a configuration indicative of a designated BWP selected based at least in part on the indication of the preferred BWP; and
- measuring at least a portion of the plurality of reference signals using the designated BWP.

9. The method of claim 8, wherein the designated BWP comprises the preferred BWP.

10. The method of claim 1, further comprising, prior to determining the frequency and the bandwidth of each of the plurality of reference signals, determining the one or more base stations to be within a threshold distance of the mobile device, based at least in part on the assistance data received by the mobile device.

11. The method of claim 10, wherein determining the one or more base stations to be within a threshold distance of the mobile device comprises using a cellular coverage area map.

12. The method of claim 1, further comprising, prior to determining the frequency and the bandwidth of each of the plurality of reference signals, determining the plurality of reference signals to be associated with the one or more base stations.

13. A mobile device comprising:
- a transceiver;
- a memory; and
- one or more processing units communicatively coupled with the transceiver and the memory and configured to:
  - determine a frequency and a bandwidth of each of a plurality of reference signals to be transmitted by one or more base stations during a positioning session, based at least in part on assistance data received by the mobile device;
  - determine a frequency and a bandwidth of each of a plurality of bandwidth parts (BWPs), based at least in part on radio receiver configuration (RRC) information received by the mobile device;
  - determine a signal strength of each reference signal of the plurality of reference signals exceeds a threshold level of signal strength;
  - responsive to determining the signal strength of each reference signal of the plurality of reference signals exceeds the threshold level of signal strength, determine a geometry of arrival for each of the plurality of reference signals originating from the one or more base stations;
  - determine a preferred BWP based at least in part on:
    - the frequency and the bandwidth of the plurality of the reference signals,
    - the frequency and the bandwidth of the plurality of BWPs, and
    - a geometric dilution of precision of the geometry of arrival of the plurality of the reference signals; and
  - send, via the transceiver, an indication of the preferred BWP to a serving base station.

14. The mobile device of claim 13, wherein the one or more processing units are configured to determine the preferred BWP further based at least in part on a number of measurements of reference signals of the plurality of reference signals that may be measured by the mobile device using the preferred BWP during the positioning session without retuning the transceiver of the mobile device.

15. The mobile device of claim 13, wherein the one or more processing units are configured to carry out the positioning session in an E-ULTRA New Radio Dual Connectivity (ENDC) or Non-Standalone (NSA) mode.

16. The mobile device of claim 13, wherein the plurality of reference signals comprise:
- a positioning reference signal (PRS),
- a tracking reference signal (TRS), or
- a synchronization signal block (SSB), or
- any combination thereof.

17. The mobile device of claim 13, wherein the assistance data is received from a location server (LS), the serving base station, or both.

18. The mobile device of claim 13, wherein the assistance data comprises dedicated assistance data, broadcast assistance data, or both.

19. The mobile device of claim 13, wherein the one or more processing units are further configured to, subsequent to sending the indication of the preferred BWP to the serving base station, send, via the transceiver, a request for a reference signal to the serving base station or an LS; wherein the reference signal is to be transmitted using the preferred BWP.

20. The mobile device of claim 13, wherein the one or more processing units are further configured to, subsequent to sending the indication of the preferred BWP to the serving base station:
  receive, via the transceiver, a configuration indicative of a designated BWP selected based at least in part on the indication of the preferred BWP; and
  measure, with the transceiver, at least a portion of the plurality of reference signals using the designated BWP.

21. The mobile device of claim 20, wherein the designated BWP comprises the preferred BWP.

22. The mobile device of claim 13, wherein the one or more processing units are configured to, prior to determining the frequency and the bandwidth of each of the plurality of reference signals, determine the one or more base stations to be within a threshold distance of the mobile device, based at least in part on the assistance data received by the mobile device.

23. The mobile device of claim 22, wherein, to determine the one or more base stations to be within a threshold distance of the mobile device, the one or more processing units are configured to use a cellular coverage area map.

24. The mobile device of claim 13, wherein the one or more processing units are configured to, prior to determining the frequency and the bandwidth of each of the plurality of reference signals, determine the plurality of reference signals to be associated with the one or more base stations.

* * * * *